United States Patent
Eichenholz

(10) Patent No.: US 10,627,516 B2
(45) Date of Patent: Apr. 21, 2020

(54) ADJUSTABLE PULSE CHARACTERISTICS FOR GROUND DETECTION IN LIDAR SYSTEMS

(71) Applicant: LUMINAR TECHNOLOGIES, INC., Orlando, FL (US)

(72) Inventor: Jason M. Eichenholz, Orlando, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 16/040,263

(22) Filed: Jul. 19, 2018

(65) Prior Publication Data

US 2020/0025923 A1    Jan. 23, 2020

(51) Int. Cl.
| | |
|---|---|
| G01S 17/00 | (2020.01) |
| G01S 17/26 | (2020.01) |
| G01S 17/89 | (2020.01) |
| G02B 26/10 | (2006.01) |
| G01S 17/931 | (2020.01) |

(52) U.S. Cl.
CPC .............. G01S 17/26 (2020.01); G01S 17/89 (2013.01); G01S 17/931 (2020.01); G02B 26/105 (2013.01)

(58) Field of Classification Search
USPC ........................................................ 356/5.01
See application file for complete search history.

(56) References Cited

U.S. PATENT DOCUMENTS

| | | | |
|---|---|---|---|
| 5,006,721 | A  | 4/1991  | Cameron et al. |
| 6,318,634 | B1 | 11/2001 | Svetal et al. |
| 6,449,384 | B2 | 9/2002  | Laumeyer et al. |
| 6,542,226 | B1 | 4/2003  | Wernet |
| 6,710,324 | B2 | 3/2004  | Hipp |
| 6,723,975 | B2 | 4/2004  | Saccomanno |
| 6,747,747 | B2 | 6/2004  | Hipp |
| 6,759,649 | B2 | 7/2004  | Hipp |
| 7,092,548 | B2 | 8/2006  | Laumeyer et al. |
| 7,209,221 | B2 | 4/2007  | Breed et al. |
| 7,345,271 | B2 | 3/2008  | Boehlau et al. |
| 7,443,903 | B2 | 10/2008 | Leonardo et al. |
| 7,532,311 | B2 | 5/2009  | Henderson et al. |

(Continued)

FOREIGN PATENT DOCUMENTS

JP    7-134178    5/1995

OTHER PUBLICATIONS

International Search Report for PCT/US2018/024865 dated Jun. 26, 2018.

(Continued)

*Primary Examiner* — James R Hulka

(57) ABSTRACT

A method in a lidar system for scanning a field of regard of the lidar system is provided. The method includes identifying, within the field of regard, a ground portion that overlaps a region of ground located ahead of the lidar system; causing a light source to emit pulses of light; scanning at least a portion of the emitted pulses of light along a scan pattern contained within the field of regard, including adjusting a scan parameter so that at least one of a resolution or a pulse energy for the ground portion of the field of regard is modified relative to another portion of the field of regard; and detecting at least a portion of the scanned pulses of light scattered by one or more remote targets.

29 Claims, 17 Drawing Sheets

(56) References Cited

U.S. PATENT DOCUMENTS

| | | | |
|---|---|---|---|
| 7,570,793 B2 | 8/2009 | Lages et al. | |
| 7,583,364 B1 | 9/2009 | Mayor et al. | |
| 7,649,920 B2 | 1/2010 | Welford | |
| 7,652,752 B2 | 1/2010 | Fetzer et al. | |
| 7,872,794 B1 | 1/2011 | Minelly et al. | |
| 7,902,570 B2 | 3/2011 | Itzler et al. | |
| 7,945,408 B2 | 5/2011 | Dimsdale et al. | |
| 7,969,558 B2 | 6/2011 | Hall | |
| 7,995,796 B2 | 8/2011 | Retterath et al. | |
| 8,059,263 B2 | 11/2011 | Haberer et al. | |
| 8,072,663 B2 | 12/2011 | O'Neill et al. | |
| 8,081,301 B2 | 12/2011 | Stann et al. | |
| 8,138,849 B2 | 3/2012 | West et al. | |
| 8,279,420 B2 | 10/2012 | Ludwig et al. | |
| 8,280,623 B2 | 10/2012 | Trepagnier et al. | |
| 8,346,480 B2 | 1/2013 | Trepagnier et al. | |
| 8,364,334 B2 | 1/2013 | Au et al. | |
| 8,452,561 B2 | 5/2013 | Dimsdale et al. | |
| 8,548,014 B2 | 10/2013 | Fermann et al. | |
| 8,625,080 B2 | 1/2014 | Heizmann et al. | |
| 8,675,181 B2 | 3/2014 | Hall | |
| 8,723,955 B2 | 5/2014 | Kiehn et al. | |
| 8,767,190 B2 | 7/2014 | Hall | |
| 8,796,605 B2 | 8/2014 | Mordarski et al. | |
| 8,836,922 B1 | 9/2014 | Pennecot et al. | |
| 8,880,296 B2 | 11/2014 | Breed | |
| 8,896,818 B2 | 11/2014 | Walsh et al. | |
| 8,934,509 B2 | 1/2015 | Savage-Leuchs et al. | |
| 9,000,347 B2 | 4/2015 | Woodward et al. | |
| 9,041,136 B2 | 5/2015 | Chia | |
| 9,048,370 B1 | 6/2015 | Urmson et al. | |
| 9,063,549 B1 | 6/2015 | Pennecot et al. | |
| 9,069,060 B1 | 6/2015 | Zbrozek et al. | |
| 9,074,878 B2 | 7/2015 | Steffey et al. | |
| 9,086,273 B1 | 7/2015 | Gruver et al. | |
| 9,086,481 B1 | 7/2015 | Dowdall et al. | |
| 9,091,754 B2 | 7/2015 | d'Aligny | |
| 9,103,669 B2 | 8/2015 | Giacotto et al. | |
| 9,121,703 B1 | 9/2015 | Droz et al. | |
| 9,160,140 B2 | 10/2015 | Gusev et al. | |
| 9,170,333 B2 | 10/2015 | Mheen et al. | |
| 9,199,641 B2 | 12/2015 | Ferguson et al. | |
| 9,213,085 B2 | 12/2015 | Kanter | |
| 9,239,260 B2 | 1/2016 | Bayha et al. | |
| 9,246,041 B1 | 1/2016 | Clausen et al. | |
| 9,279,662 B2 | 3/2016 | Steffey et al. | |
| 9,285,464 B2 | 3/2016 | Pennecot et al. | |
| 9,285,477 B1 | 3/2016 | Smith et al. | |
| 9,297,901 B2 | 3/2016 | Bayha et al. | |
| 9,299,731 B1 | 3/2016 | Lenius et al. | |
| 9,304,154 B1 | 4/2016 | Droz et al. | |
| 9,304,203 B1 | 4/2016 | Droz et al. | |
| 9,304,316 B2 | 4/2016 | Weiss et al. | |
| 9,310,471 B2 | 4/2016 | Sayyah et al. | |
| 9,322,646 B2 | 4/2016 | Pochiraju et al. | |
| 9,335,255 B2 | 5/2016 | Retterath et al. | |
| 9,360,554 B2 | 6/2016 | Retterath et al. | |
| 9,368,933 B1 | 6/2016 | Nijjar et al. | |
| 9,383,201 B2 | 7/2016 | Jachman et al. | |
| 9,383,445 B2 | 7/2016 | Lu et al. | |
| 9,383,753 B1 | 7/2016 | Templeton et al. | |
| 9,477,007 B2* | 10/2016 | Albert | G01V 8/10 |
| 9,606,222 B2* | 3/2017 | Bayha | G01S 7/4868 |
| 9,625,580 B2* | 4/2017 | Kotelnikov | G01S 17/89 |
| 9,791,555 B2* | 10/2017 | Zhu | G01S 17/08 |
| 9,798,003 B2* | 10/2017 | Hammes | G01S 17/10 |
| 9,817,121 B2* | 11/2017 | Inoue | G01P 3/68 |
| 9,823,351 B2* | 11/2017 | Haslim | G01S 17/06 |
| RE46,672 E | 1/2018 | Hall | |
| 9,923,329 B2* | 3/2018 | Savage-Leuchs | H01S 3/06758 |
| 10,107,914 B2* | 10/2018 | Kalscheur | G01S 17/89 |
| 10,114,111 B2 | 10/2018 | Russell et al. | |
| 10,254,388 B2 | 4/2019 | LaChapelle et al. | |
| 2001/0043717 A1* | 11/2001 | Laumeyer | G06K 9/00818 382/104 |
| 2002/0071126 A1 | 6/2002 | Shirai et al. | |
| 2002/0149760 A1* | 10/2002 | Hipp | G01S 17/42 356/5.01 |
| 2002/0149761 A1* | 10/2002 | Saccomanno | G01C 5/005 356/5.03 |
| 2003/0043058 A1* | 3/2003 | Jamieson | G01C 23/005 340/961 |
| 2003/0066954 A1* | 4/2003 | Hipp | G01S 7/4812 250/234 |
| 2003/0080285 A1* | 5/2003 | Hipp | G01S 7/487 250/221 |
| 2004/0062442 A1* | 4/2004 | Laumeyer | G06K 9/00818 382/190 |
| 2004/0141170 A1* | 7/2004 | Jamieson | G01S 7/4811 356/5.01 |
| 2005/0034036 A1* | 2/2005 | Lages | G01S 17/023 714/100 |
| 2005/0195383 A1* | 9/2005 | Breed | B60N 2/002 356/4.01 |
| 2006/0145062 A1* | 7/2006 | Boehlau | G01S 7/4811 250/221 |
| 2006/0227317 A1* | 10/2006 | Henderson | G01B 11/026 356/28 |
| 2006/0290920 A1 | 12/2006 | Kampchen et al. | |
| 2007/0024840 A1* | 2/2007 | Fetzer | G01S 7/4811 356/4.01 |
| 2007/0071126 A1 | 3/2007 | van Rooyen | |
| 2007/0091940 A1 | 4/2007 | Jameson | |
| 2007/0248136 A1* | 10/2007 | Leonardo | B23K 26/067 372/55 |
| 2008/0247425 A1* | 10/2008 | Welford | H01S 3/042 372/10 |
| 2008/0309913 A1 | 12/2008 | Fallon | |
| 2009/0099813 A1* | 4/2009 | Dimsdale | G01S 7/4861 702/176 |
| 2009/0102313 A1* | 4/2009 | West | H04B 5/00 310/232 |
| 2009/0140887 A1 | 6/2009 | Breed et al. | |
| 2009/0252376 A1* | 10/2009 | Retterath | G08G 1/096758 382/104 |
| 2009/0273770 A1 | 11/2009 | Bauhahn et al. | |
| 2010/0007870 A1* | 1/2010 | Haberer | G01S 7/4811 356/5.01 |
| 2010/0020306 A1* | 1/2010 | Hall | G01S 7/4813 356/5.01 |
| 2010/0025798 A1* | 2/2010 | Itzler | H01L 31/1075 257/438 |
| 2010/0034221 A1 | 2/2010 | Dragic | |
| 2010/0053715 A1* | 3/2010 | O'Neill | G01S 7/4817 359/199.3 |
| 2010/0114416 A1* | 5/2010 | Au | G01C 21/165 701/23 |
| 2010/0128248 A1* | 5/2010 | Heizmann | G01S 7/484 356/5.01 |
| 2010/0165082 A1* | 7/2010 | Kiehn | G01S 7/4811 348/46 |
| 2010/0250189 A1 | 9/2010 | Brown | |
| 2010/0302528 A1* | 12/2010 | Hall | G01C 1/04 356/5.01 |
| 2011/0000694 A1 | 1/2011 | Hansson et al. | |
| 2011/0006943 A1 | 1/2011 | Shaffer | |
| 2011/0032508 A1* | 2/2011 | Ludwig | G01S 17/36 356/5.01 |
| 2011/0085155 A1* | 4/2011 | Stann | G01C 3/08 356/5.09 |
| 2011/0102764 A1* | 5/2011 | Walsh | G01S 7/4818 356/4.07 |
| 2011/0122895 A1* | 5/2011 | Savage-Leuchs | H01S 3/06716 372/10 |
| 2011/0161031 A1* | 6/2011 | Dimsdale | G01S 7/4861 702/89 |
| 2011/0216304 A1* | 9/2011 | Hall | G01S 7/4813 356/4.01 |

(56) References Cited

U.S. PATENT DOCUMENTS

| | | | |
|---|---|---|---|
| 2012/0035788 A1* | 2/2012 | Trepagnier | B60W 30/00 701/3 |
| 2012/0101680 A1* | 4/2012 | Trepagnier | G01S 17/023 701/26 |
| 2012/0162373 A1* | 6/2012 | Mheen | G01S 17/89 348/46 |
| 2012/0219020 A1* | 8/2012 | Fermann | H01S 3/067 372/6 |
| 2012/0227263 A1 | 9/2012 | Leclair et al. | |
| 2013/0033742 A1 | 2/2013 | Rogers et al. | |
| 2013/0050676 A1* | 2/2013 | d'Aligny | G01S 17/10 356/5.01 |
| 2013/0054187 A1* | 2/2013 | Pochiraju | G01C 3/08 702/150 |
| 2013/0087689 A1* | 4/2013 | Woodward | G01J 1/42 250/216 |
| 2013/0211672 A1 | 8/2013 | Roehder | |
| 2013/0235366 A1* | 9/2013 | Giacotto | G01C 3/08 356/5.01 |
| 2014/0027607 A1* | 1/2014 | Mordarski | G01J 1/44 250/206 |
| 2014/0063255 A1* | 3/2014 | Breed | B60R 19/205 348/148 |
| 2014/0063482 A1 | 3/2014 | Gusev | |
| 2014/0063489 A1* | 3/2014 | Steffey | G01S 17/023 356/72 |
| 2014/0078519 A1* | 3/2014 | Steffey | G01S 7/4817 356/625 |
| 2014/0111805 A1 | 4/2014 | Albert et al. | |
| 2014/0159925 A1 | 6/2014 | Mimeault et al. | |
| 2014/0168631 A1 | 6/2014 | Haslim et al. | |
| 2014/0176933 A1 | 6/2014 | Haslim et al. | |
| 2014/0211194 A1 | 7/2014 | Pacala et al. | |
| 2014/0233942 A1* | 8/2014 | Kanter | G01S 17/102 398/25 |
| 2014/0293263 A1 | 10/2014 | Justice et al. | |
| 2014/0293266 A1 | 10/2014 | Hsu et al. | |
| 2014/0300952 A1* | 10/2014 | Gusev | H01S 5/06216 359/341.5 |
| 2014/0319638 A1* | 10/2014 | Chia | H01L 31/107 257/438 |
| 2014/0320845 A1* | 10/2014 | Bayha | G01S 17/026 356/5.03 |
| 2014/0327945 A1* | 11/2014 | Weiss | H04N 3/08 359/198.1 |
| 2014/0332676 A1* | 11/2014 | Bayha | G01S 7/4813 250/227.26 |
| 2015/0015868 A1* | 1/2015 | Jachman | G01C 3/08 356/5.01 |
| 2015/0055117 A1* | 2/2015 | Pennecot | G01S 17/89 356/4.01 |
| 2015/0131080 A1 | 5/2015 | Retterath et al. | |
| 2015/0177368 A1 | 6/2015 | Bayha et al. | |
| 2015/0185244 A1 | 7/2015 | Inoue et al. | |
| 2015/0185313 A1 | 7/2015 | Zhu | |
| 2015/0192676 A1 | 7/2015 | Kotelnikov et al. | |
| 2015/0192677 A1 | 7/2015 | Yu et al. | |
| 2015/0204978 A1 | 7/2015 | Hammes et al. | |
| 2015/0214690 A1 | 7/2015 | Savage-Leuchs et al. | |
| 2015/0220795 A1* | 8/2015 | Fischer | G01S 13/931 348/148 |
| 2015/0266472 A1* | 9/2015 | Ferguson | G01C 21/3461 701/23 |
| 2015/0293228 A1* | 10/2015 | Retterath | G01S 17/89 356/5.01 |
| 2015/0301182 A1 | 10/2015 | Geiger et al. | |
| 2015/0323654 A1 | 11/2015 | Jachmann et al. | |
| 2015/0332102 A1* | 11/2015 | Lu | G01S 7/4802 348/222.1 |
| 2015/0378012 A1* | 12/2015 | Sayyah | G01S 7/4817 356/4.01 |
| 2015/0378023 A1 | 12/2015 | Royo Royo et al. | |
| 2015/0378241 A1 | 12/2015 | Eldada | |
| 2016/0025842 A1 | 1/2016 | Anderson et al. | |
| 2016/0026184 A1 | 1/2016 | Stainvas Olshansky et al. | |
| 2016/0047896 A1 | 2/2016 | Dussan | |
| 2016/0047901 A1 | 2/2016 | Pacala et al. | |
| 2016/0049765 A1 | 2/2016 | Eldada | |
| 2016/0146939 A1 | 5/2016 | Shpunt et al. | |
| 2016/0146940 A1 | 5/2016 | Koehler | |
| 2016/0161600 A1 | 6/2016 | Eldada et al. | |
| 2016/0178802 A1 | 6/2016 | Stainvas Olshansky et al. | |
| 2016/0245919 A1 | 8/2016 | Kalscheur et al. | |
| 2016/0306032 A1 | 10/2016 | Schwarz et al. | |
| 2017/0082738 A1 | 3/2017 | Schwarz | |
| 2017/0168146 A1 | 6/2017 | Boehmke | |
| 2017/0234973 A1 | 8/2017 | Axelsson | |
| 2017/0269198 A1 | 9/2017 | Hall et al. | |
| 2017/0269209 A1 | 9/2017 | Hall et al. | |
| 2017/0307759 A1 | 10/2017 | Pei et al. | |
| 2018/0011490 A1 | 1/2018 | You et al. | |
| 2018/0032042 A1 | 2/2018 | Turpin et al. | |
| 2018/0059228 A1 | 3/2018 | Raina et al. | |
| 2018/0074203 A1 | 3/2018 | Zermas et al. | |
| 2018/0113216 A1 | 4/2018 | Kremer et al. | |
| 2018/0164439 A1 | 6/2018 | Droz et al. | |
| 2019/0064331 A1 | 2/2019 | Russell et al. | |

OTHER PUBLICATIONS

International Search Report and Written Opinion dated Nov. 8, 2019 for PCT/US2019/042612.

\* cited by examiner

ADJUSTABLE PULSE CHARACTERISTICS FOR GROUND DETECTION IN LIDAR SYSTEMS

FIELD OF TECHNOLOGY

This disclosure generally related to lidar systems and, more particularly, lidar systems that vary scan parameters when scanning the portion of the field of regard that overlaps the ground.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Light detection and ranging (lidar) is a technology that can be used to measure distances to remote targets. Typically, a lidar system includes a light source and an optical receiver. The light source can be, for example, a laser which emits light having a particular operating wavelength. The operating wavelength of a lidar system may lie, for example, in the infrared, visible, or ultraviolet portions of the electromagnetic spectrum. The light source emits light toward a target which then scatters the light. Some of the scattered light is received back at the receiver. The system determines the distance to the target based on one or more characteristics associated with the returned light. For example, the system may determine the distance to the target based on the time of flight of a returned light pulse.

A typical lidar system is configured to wait for the scattered light to return during a certain fixed period of time $t_{max}$ corresponding to the time it takes a light pulse to travel the maximum distance at which the lidar system is configured to detect targets, and back. For example, the lidar system may be configured to detect objects up to 200 meters away, and $t_{max}$ accordingly can be approximately 1.33 μs. If the lidar system does not detect scattered light within $t_{max}$, the lidar system concludes that no object was present to scatter the outbound pulse, and generates the next light pulse.

SUMMARY

To improve resolution and/or dynamically vary the laser power when certain properties of the targets are known, a lidar system operating in a terrestrial vehicle (e.g., a car, a truck, an agricultural vehicle) determines where the field of regard of the vehicle overlaps the region of the ground and adjusts one or more characteristics of the scan for this portion of the field of regard. More specifically, the lidar system can adjust the scan rate and/or the power of outbound light pulses. Changes to resolution can include changes in pixel density along the horizontal dimension and/or changes in line density (corresponding to pixel density along the vertical dimension).

One example embodiment of these techniques is a lidar system comprising a light source configured to emit pulses of light, a scanner configured to scan at least a portion of the emitted pulses of light along a scan pattern contained within a field of regard of the lidar system, a receiver configured to detect at least a portion of the scanned pulses of light scattered by one or more remote targets, and a processor. The field of regard includes a ground portion that overlaps a region of ground located ahead of the lidar system. The processor is configured to identify the ground portion of the field of regard, and, when the emitted pulses scan the ground portion of the field of regard during a subsequent scan of the field of regard, adjust a scan parameter so that at least one of a resolution or a pulse energy for the ground portion of the field of regard is modified relative to another portion of the field of regard.

Another example embodiment of these techniques is a method in a lidar system for scanning a field of regard of the lidar system. The method includes identifying, within the field of regard, a ground portion that overlaps a region of ground located ahead of the lidar system; causing a light source to emit pulses of light; scanning at least a portion of the emitted pulses of light along a scan pattern contained within the field of regard, including adjusting a scan parameter so that at least one of a resolution or a pulse energy for the ground portion of the field of regard is modified relative to another portion of the field of regard; and detecting at least a portion of the scanned pulses of light scattered by one or more remote targets.

Still another example embodiment of these techniques is an autonomous vehicle comprising vehicle maneuvering components to effectuate at least steering, acceleration, and braking of the autonomous vehicle. The autonomous vehicle further comprises a lidar system including a light source configured to emit pulses of light, a scanner configured to scan at least a portion of the emitted pulses of light along a scan pattern contained within a field of regard of the lidar system, where the field of regard includes a ground portion that overlaps a region of ground located ahead of the lidar system, and a receiver configured to detect at least a portion of the scanned pulses of light scattered by one or more remote targets. The autonomous vehicle further includes a vehicle controller communicatively coupled to the vehicle maneuvering components and the lidar system, the vehicle controller configured to control the vehicle maneuvering components using the signals generated by the lidar system. The lidar system is configured to, when the emitted pulses scan the ground portion of the field of regard during a subsequent scan of the field of regard, adjust a scan parameter so that at least one of a resolution or a pulse energy for the ground portion of the field of regard is modified relative to another portion of the field of regard.

Another example embodiment of these techniques is a method in a lidar system for determining reflectivity of a certain region within a field of regard. The method includes causing a light source to emit pulses of light and scanning the emitted pulses of light across the field of regard along a scan pattern. The method further includes determining an amount of emitted light directed toward a region of interest contained within the field of regard during a scan, determining an amount of light scattered by one or more targets disposed in the region of interest, and determining a physical property of the region of interest using the determined amount of emitted light and the determined amount of scattered light. In an embodiment, the physical property is an estimate of reflectivity of the region of interest. In an embodiment, the method further includes determining, based on the determining reflectivity, whether the region of interest is a ground region within the field of regard. In an embodiment, determining the amount of emitted light includes determining a total amount of light contained in a plurality of emitted pulses directed toward the region of interest in accordance with the scan pattern. In an embodiment, determining the amount of scattered light includes determining a total amount of light contained in a plurality of returns corresponding to a plurality of emitted pulses directed toward the region of interest in accordance with the scan pattern. Determining the amount of scattered light in some embodiments in an embodiment includes eliminating statistical outliers from among the plurality of returns or absences of returns corresponding to some of the emitted pulses.

DETAILED DESCRIPTION

Overview

A lidar system configured to operate in a terrestrial vehicle determines, based on the data previously collected by the lidar system or an indication from another sensor, where the field of regard of the lidar system overlaps a region of ground located ahead of the lidar system ("the ground region"), and adjusts one or more scan parameters for the scan of the corresponding portion of the field of regard ("the ground portion").

In some cases, the lidar system determines the ground portion of the field of regard using the data collected during the previous scan or scans of the field of regard. The lidar system also can use data from a camera (e.g., a CCD or CMOS camera), an acoustic array, or another suitable sensor or a combination of sensors. Further, the lidar system can use positioning data along with topographical data from a GIS system (pre-stored or received via a communication network for the relevant location), and further in view of where the lidar system is mounted in the vehicle.

The one or more scan parameters the lidar system can modify include scan line density, horizontal resolution, pixel density, pulse rate or pulse repetition frequency, pulse energy, etc. The lidar system can vary these scan parameters by modifying the operation of the light source and/or the scanner, for example. By adjusting one or more scan parameters for the ground portion of the field of regard, the lidar system can produce a high-resolution scan of a portion of the field of regard and/or a more efficient distribution of laser power across the field of regard.

The lidar system thus can provide additional horizontal resolution for many driving scenarios where it is desirable. For example, when scanning the road, additional horizontal resolution is helpful in identifying road markers, lanes, potholes, retroreflectors, or other objects located on or associated with the road. The lidar system also can provide additional laser power in those driving scenarios when additional laser power is desirable. For example, when the lidar system emits a light pulse that strikes the road at a low enough grazing angle (aka, a glancing angle), the light pulse is reflected by the road and very little light is scattered.

Example Lidar System

Figure 1:
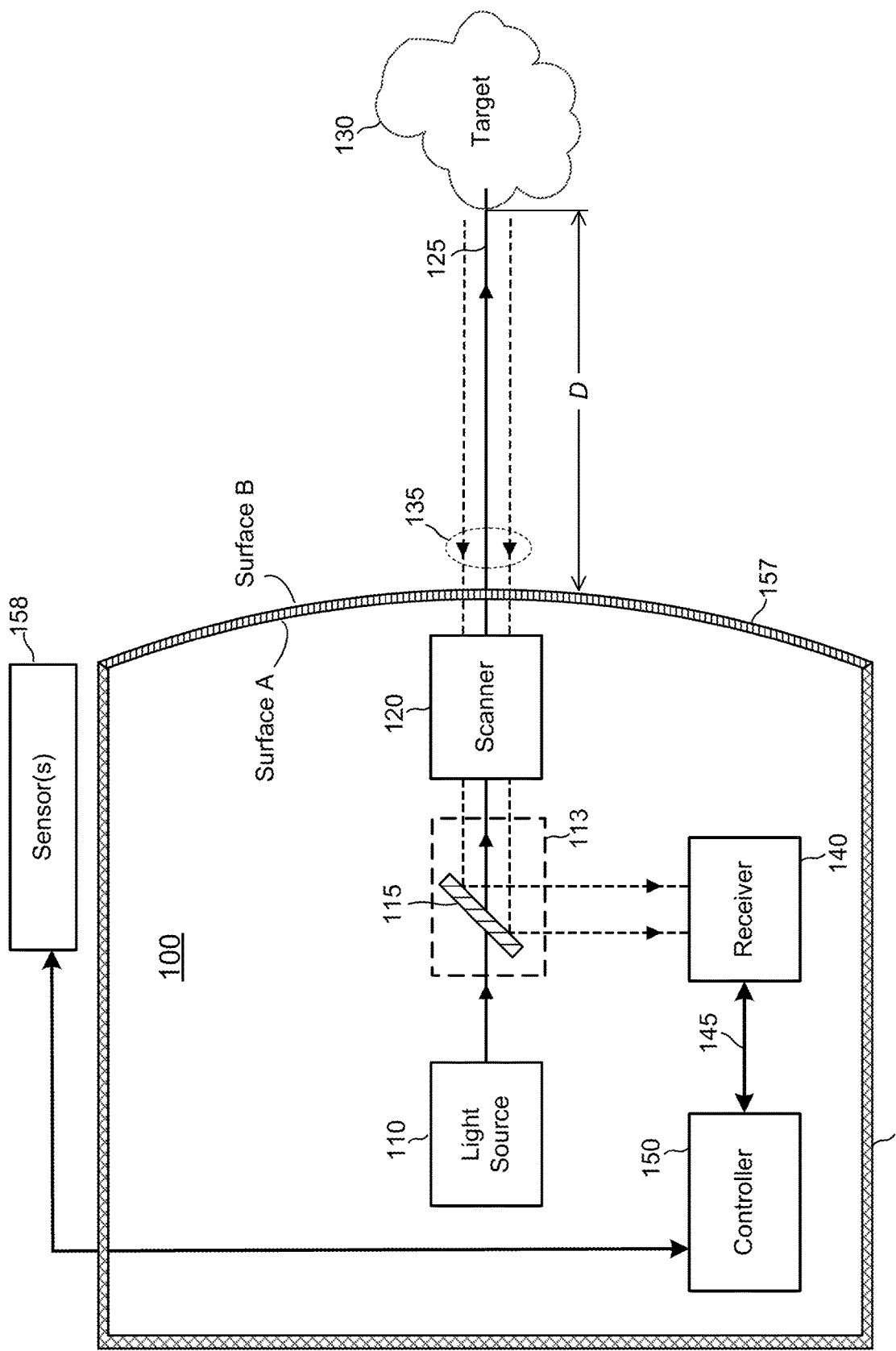
FIG. 1 is a block diagram of an example light detection and ranging (lidar) system in which the techniques of this disclosure can be implemented.

FIG. 1 illustrates an example light detection and ranging (lidar) system 100. The lidar system 100 may be referred to as a laser ranging system, a laser radar system, a LIDAR system, a lidar sensor, or a laser detection and ranging (LADAR or ladar) system. The lidar system 100 may include a light source 110, an optical coupling component 113 including a mirror 115, a scanner 120, a receiver 140, and a controller 150. The light source 110 may be, for example, a laser which emits light having a particular operating wavelength in the infrared, visible, or ultraviolet portions of the electromagnetic spectrum. As a more specific example, the light source 110 may include a laser with an operating wavelength between approximately 1.2 µm and 1.7 µm.

In operation, the light source 110 emits an output beam of light 125 which may be continuous-wave (CW), pulsed, or modulated in any suitable manner for a given application. In this disclosure, the emitted light can be described as a pulse of light. In some implementations, the pulse may have a duration as long as the time interval until the next emitted pulse. In some implementations, the pulse may exhibit a variation in light intensity and/or a variation in light frequency throughout the duration of the pulse. Thus, for example, in a frequency-modulated CW (FMCW) lidar system, a pulse may be defined by a full cycle of the modulated frequency, even when the intensity stays constant within the pulse or from one pulse to another. The output beam of light 125 is directed downrange toward a remote target 130 located a distance D from the lidar system 100 and at least partially contained within a field of regard of the system 100. Depending on the scenario and/or the implementation of the lidar system 100, D can be between 1 m and 1 km, for example.

Once the output beam 125 reaches the downrange target 130, the target 130 may scatter or, in some cases, reflect at least a portion of light from the output beam 125, and some of the scattered or reflected light may return toward the lidar system 100. In the example of FIG. 1, the scattered or reflected light is represented by input beam 135, which passes through the scanner 120, which may be referred to as a beam scanner, optical scanner, or laser scanner. The input beam 135 passes through the scanner 120 to the mirror 115, which may be referred to as an overlap mirror, superposition mirror, or beam-combiner mirror. The mirror 115 in turn directs the input beam 135 to the receiver 140. The input beam 135 may contain only a relatively small fraction of the light from the output beam 125. For example, the ratio of average power, peak power, or pulse energy of the input beam 135 to average power, peak power, or pulse energy of the output beam 125 may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of the output beam 125 has a pulse energy of 1 microjoule (µJ), then the pulse energy of a corresponding pulse of the input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, or 1 aJ.

The output beam 125 may be referred to as a laser beam, light beam, optical beam, emitted beam, or just beam; and the input beam 135 may be referred to as a return beam, received beam, return light, received light, input light, scattered light, or reflected light. As used herein, scattered light may refer to light that is scattered or reflected by the target 130. The input beam 135 may include light from the output beam 125 that is scattered by the target 130, light from the output beam 125 that is reflected by the target 130, or a combination of scattered and reflected light from target 130.

The operating wavelength of a lidar system 100 may lie, for example, in the infrared, visible, or ultraviolet portions of the electromagnetic spectrum. The Sun also produces light in these wavelength ranges, and thus sunlight can act as background noise which can obscure signal light detected by the lidar system 100. This solar background noise can result in false-positive detections or can otherwise corrupt measurements of the lidar system 100, especially when the receiver 140 includes SPAD detectors (which can be highly sensitive).

Generally speaking, the light from the Sun that passes through the Earth's atmosphere and reaches a terrestrial-based lidar system such as the system 100 can establish an optical background noise floor for this system. Thus, in order for a signal from the lidar system 100 to be detectable, the signal must rise above the background noise floor. It is generally possible to increase the signal-to-noise (SNR) ratio of the lidar system 100 by raising the power level of the output beam 125, but in some situations it may be desirable to keep the power level of the output beam 125 relatively low. For example, increasing transmit power levels of the output beam 125 can result in the lidar system 100 not being eye-safe.

In some implementations, the lidar system 100 operates at one or more wavelengths between approximately 1400 nm and approximately 1600 nm. For example, the light source 110 may produce light at approximately 1550 nm.

In some implementations, the lidar system 100 operates at frequencies at which atmospheric absorption is relatively low. For example, the lidar system 100 can operate at wavelengths in the approximate ranges from 980 nm to 1110 nm or from 1165 nm to 1400 nm.

In other implementations, the lidar system 100 operates at frequencies at which atmospheric absorption is high. For example, the lidar system 100 can operate at wavelengths in the approximate ranges from 930 nm to 980 nm, from 1100 nm to 1165 nm, or from 1400 nm to 1460 nm.

According to some implementations, the lidar system 100 can include an eye-safe laser, or the lidar system 100 can be classified as an eye-safe laser system or laser product. An eye-safe laser, laser system, or laser product may refer to a system with an emission wavelength, average power, peak power, peak intensity, pulse energy, beam size, beam divergence, exposure time, or scanned output beam such that emitted light from the system presents little or no possibility of causing damage to a person's eyes. For example, the light source 110 or lidar system 100 may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In some implementations, the lidar system 100 may be classified as an eye-safe laser product (e.g., with a Class 1 or Class I classification) configured to operate at any suitable wavelength between approximately 1400 nm and approximately 2100 nm. In some implementations, the light source 110 may include a laser with an operating wavelength between approximately 1400 nm and approximately 1600 nm, and the lidar system 100 may be operated in an eye-safe manner. In some implementations, the light source 110 or the lidar system 100 may be an eye-safe laser product that includes a scanned laser with an operating wavelength between approximately 1530 nm and approximately 1560 nm. In some implementations, the lidar system 100 may be a Class 1 or Class I laser product that includes a fiber laser or solid-state laser with an operating wavelength between approximately 1400 nm and approximately 1600 nm.

The receiver 140 may receive or detect photons from the input beam 135 and generate one or more representative signals. For example, the receiver 140 may generate an output electrical signal 145 that is representative of the input beam 135. The receiver may send the electrical signal 145 to the controller 150. Depending on the implementation, the controller 150 may include one or more processors, an application-specific integrated circuit (ASIC), a field-programmable gate array (FPGA), and/or other suitable circuitry configured to analyze one or more characteristics of the electrical signal 145 to determine one or more characteristics of the target 130, such as its distance downrange from the lidar system 100. More particularly, the controller 150 may analyze the time of flight or phase modulation for the beam of light 125 transmitted by the light source 110. If the lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as $D=c\cdot T/2$, where c is the speed of light (approximately $3.0\times10^8$ m/s).

As a more specific example, if the lidar system 100 measures the time of flight to be T=300 ns, then the lidar system 100 can determine the distance from the target 130 to the lidar system 100 to be approximately D=45.0 m. As another example, the lidar system 100 measures the time of flight to be T=1.33 μs and accordingly determines that the distance from the target 130 to the lidar system 100 is approximately D=199.5 m. The distance D from lidar system 100 to the target 130 may be referred to as a distance, depth, or range of the target 130. As used herein, the speed of light c refers to the speed of light in any suitable medium, such as for example in air, water, or vacuum. The speed of light in vacuum is approximately $2.9979\times10^8$ m/s, and the speed of light in air (which has a refractive index of approximately 1.0003) is approximately $2.9970\times10^8$ m/s.

The target 130 may be located a distance D from the lidar system 100 that is less than or equal to a maximum range $R_{MAX}$ of the lidar system 100. The maximum range $R_{MAX}$ (which also may be referred to as a maximum distance) of a lidar system 100 may correspond to the maximum distance over which the lidar system 100 is configured to sense or identify targets that appear in a field of regard of the lidar system 100. The maximum range of lidar system 100 may be any suitable distance, such as for example, 25 m, 50 m, 100 m, 200 m, 500 m, or 1 km. As a specific example, a lidar system with a 200-m maximum range may be configured to sense or identify various targets located up to 200 m away. For a lidar system with a 200-m maximum range ($R_{MAX}$=200 m), the time of flight corresponding to the maximum range is approximately $2\cdot R_{MAX}/c \cong 1.33$ μs.

In some implementations, the light source 110, the scanner 120, and the receiver 140 may be packaged together within a single housing 155, which may be a box, case, or enclosure that holds or contains all or part of a lidar system 100. The housing 155 includes a window 157 through which the beams 125 and 135 pass. In one example implementation, the lidar-system housing 155 contains the light source 110, the overlap mirror 115, the scanner 120, and the receiver 140 of a lidar system 100. The controller 150 may reside within the same housing 155 as the components 110, 120, and 140, or the controller 150 may reside remotely from the housing.

Moreover, in some implementations, the housing 155 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, depending on the implementation.

The housing 155 may be an airtight or watertight structure that prevents water vapor, liquid water, dirt, dust, or other contaminants from getting inside the housing 155. The housing 155 may be filled with a dry or inert gas, such as for example dry air, nitrogen, or argon. The housing 155 may include one or more electrical connections for conveying electrical power or electrical signals to and/or from the housing.

The window 157 may be made from any suitable substrate material, such as for example, glass or plastic (e.g., polycarbonate, acrylic, cyclic-olefin polymer, or cyclic-olefin copolymer). The window 157 may include an interior surface (surface A) and an exterior surface (surface B), and surface A or surface B may include a dielectric coating having particular reflectivity values at particular wavelengths. A dielectric coating (which may be referred to as a thin-film coating, interference coating, or coating) may include one or more thin-film layers of dielectric materials (e.g., $SiO_2$, $TiO_2$, $Al_2O_3$, $Ta_2O_5$, $MgF_2$, $LaF_3$, or $AlF_3$) having particular thicknesses (e.g., thickness less than 1 μm) and particular refractive indices. A dielectric coating may be deposited onto surface A or surface B of the window 157 using any suitable deposition technique, such as for example, sputtering or electron-beam deposition.

The dielectric coating may have a high reflectivity at a particular wavelength or a low reflectivity at a particular wavelength. A high-reflectivity (HR) dielectric coating may have any suitable reflectivity value (e.g., a reflectivity greater than or equal to 80%, 90%, 95%, or 99%) at any suitable wavelength or combination of wavelengths. A low-reflectivity dielectric coating (which may be referred to as an anti-reflection (AR) coating) may have any suitable reflectivity value (e.g., a reflectivity less than or equal to 5%, 2%, 1%, 0.5%, or 0.2%) at any suitable wavelength or combination of wavelengths. In particular embodiments, a dielectric coating may be a dichroic coating with a particular combination of high or low reflectivity values at particular wavelengths. For example, a dichroic coating may have a reflectivity of less than or equal to 0.5% at approximately 1550-1560 nm and a reflectivity of greater than or equal to 90% at approximately 800-1500 nm.

In some implementations, surface A or surface B has a dielectric coating that is anti-reflecting at an operating wavelength of one or more light sources 110 contained within enclosure 155. An AR coating on surface A and surface B may increase the amount of light at an operating wavelength of light source 110 that is transmitted through the window 157. Additionally, an AR coating at an operating wavelength of the light source 110 may reduce the amount of incident light from output beam 125 that is reflected by the window 157 back into the housing 155. In an example implementation, each of surface A and surface B has an AR coating with reflectivity less than 0.5% at an operating wavelength of light source 110. As an example, if the light source 110 has an operating wavelength of approximately 1550 nm, then surface A and surface B may each have an AR coating with a reflectivity that is less than 0.5% from approximately 1547 nm to approximately 1553 nm. In another implementation, each of surface A and surface B has an AR coating with reflectivity less than 1% at the operating wavelengths of the light source 110. For example, if the housing 155 encloses two sensor heads with respective light sources, the first light source emits pulses at a wavelength of approximately 1535 nm and the second light source emits pulses at a wavelength of approximately 1540 nm, then surface A and surface B may each have an AR coating with reflectivity less than 1% from approximately 1530 nm to approximately 1545 nm.

The window 157 may have an optical transmission that is greater than any suitable value for one or more wavelengths of one or more light sources 110 contained within the housing 155. As an example, the window 157 may have an optical transmission of greater than or equal to 70%, 80%, 90%, 95%, or 99% at a wavelength of light source 110. In one example implementation, the window 157 can transmit greater than or equal to 95% of light at an operating wavelength of the light source 110. In another implementation, the window 157 transmits greater than or equal to 90% of light at the operating wavelengths of the light sources enclosed within the housing 155.

Surface A or surface B may have a dichroic coating that is anti-reflecting at one or more operating wavelengths of one or more light sources 110 and high-reflecting at wavelengths away from the one or more operating wavelengths. For example, surface A may have an AR coating for an operating wavelength of the light source 110, and surface B may have a dichroic coating that is AR at the light-source operating wavelength and HR for wavelengths away from the operating wavelength. A coating that is HR for wavelengths away from a light-source operating wavelength may prevent most incoming light at unwanted wavelengths from being transmitted through the window 117. In one implementation, if light source 110 emits optical pulses with a wavelength of approximately 1550 nm, then surface A may have an AR coating with a reflectivity of less than or equal to 0.5% from approximately 1546 nm to approximately 1554 nm. Additionally, surface B may have a dichroic coating that is AR at approximately 1546-1554 nm and HR (e.g., reflectivity of greater than or equal to 90%) at approximately 800-1500 nm and approximately 1580-1700 nm.

Surface B of the window 157 may include a coating that is oleophobic, hydrophobic, or hydrophilic. A coating that is oleophobic (or, lipophobic) may repel oils (e.g., fingerprint oil or other non-polar material) from the exterior surface (surface B) of the window 157. A coating that is hydrophobic may repel water from the exterior surface. For example, surface B may be coated with a material that is both oleophobic and hydrophobic. A coating that is hydrophilic attracts water so that water may tend to wet and form a film on the hydrophilic surface (rather than forming beads of water as may occur on a hydrophobic surface). If surface B has a hydrophilic coating, then water (e.g., from rain) that lands on surface B may form a film on the surface. The surface film of water may result in less distortion, deflection, or occlusion of an output beam 125 than a surface with a non-hydrophilic coating or a hydrophobic coating.

With continued reference to FIG. 1, the light source 110 may include a pulsed laser configured to produce or emit pulses of light with a certain pulse duration. In an example implementation, the pulse duration or pulse width of the pulsed laser is approximately 10 picoseconds (ps) to 100 nanoseconds (ns). In another implementation, the light source 110 is a pulsed laser that produces pulses with a pulse duration of approximately 1-4 ns. In yet another implementation, the light source 110 is a pulsed laser that produces pulses at a pulse repetition frequency of approximately 100 kHz to 5 MHz or a pulse period (e.g., a time between consecutive pulses) of approximately 200 ns to 10 μs. The light source 110 may have a substantially constant or a variable pulse repetition frequency, depending on the implementation. As an example, the light source 110 may be a pulsed laser that produces pulses at a substantially constant pulse repetition frequency of approximately 640 kHz (e.g., 640,000 pulses per second), corresponding to a pulse period of approximately 1.56 μs. As another example, the light source 110 may have a pulse repetition frequency that can be varied from approximately 500 kHz to 3 MHz. As used herein, a pulse of light may be referred to as an optical pulse, a light pulse, or a pulse, and a pulse repetition frequency may be referred to as a pulse rate.

In general, the output beam 125 may have any suitable average optical power, and the output beam 125 may include optical pulses with any suitable pulse energy or peak optical power. Some examples of the average power of the output beam 125 include the approximate values of 1 mW, 10 mW, 100 mW, 1 W, and 10 W. Example values of pulse energy of the output beam 125 include the approximate values of 0.1 μJ, 1 μJ, 10 μJ, 100 μJ, and 1 mJ. Examples of peak power values of pulses included in the output beam 125 are the approximate values of 10 W, 100 W, 1 kW, 5 kW, 10 kW. An example optical pulse with a duration of 1 ns and a pulse energy of 1 μJ has a peak power of approximately 1 kW. If the pulse repetition frequency is 500 kHz, then the average power of the output beam 125 with 1-μJ pulses is approximately 0.5 W, in this example.

The light source 110 may include a laser diode, such as a Fabry-Perot laser diode, a quantum well laser, a distributed Bragg reflector (DBR) laser, a distributed feedback (DFB) laser, or a vertical-cavity surface-emitting laser (VCSEL). The laser diode operating in the light source 110 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable diode. In some implementations, the light source 110 includes a pulsed laser diode with a peak emission wavelength of approximately 1400-1600 nm. Further, the light source 110 may include a laser diode that is current-modulated to produce optical pulses.

In some implementations, the light source 110 includes a pulsed laser diode followed by one or more optical-amplification stages. For example, the light source 110 may be a fiber-laser module that includes a current-modulated laser diode with a peak wavelength of approximately 1550 nm, followed by a single-stage or a multi-stage erbium-doped fiber amplifier (EDFA). As another example, the light source 110 may include a continuous-wave (CW) or quasi-CW laser diode followed by an external optical modulator (e.g., an electro-optic modulator), and the output of the modulator may be fed into an optical amplifier. In other implementations, the light source 110 may include a laser diode which produces optical pulses that are not amplified by an optical amplifier. As an example, a laser diode (which may be referred to as a direct emitter or a direct-emitter laser diode) may emit optical pulses that form an output beam 125 that is directed downrange from a lidar system 100. In yet other implementations, the light source 110 may include a pulsed solid-state laser or a pulsed fiber laser.

Although this disclosure describes or illustrates example embodiments of lidar systems or light sources that produce light waveforms that include pulses of light, the embodiments described or illustrated herein may also be applied to other types of light waveforms, including continuous-wave (CW) light or modulated light waveforms. For example, a lidar system as described or illustrated herein may include a light source configured to produce pulses of light. Alternatively, a lidar system may be configured to act as a frequency-modulated continuous-wave (FMCW) lidar system and may include a light source configured to produce CW light or a frequency-modulated light waveform.

A pulsed lidar system is one type of lidar system in which the light source emits pulses of light, and the distance to a remote target is determined from the time-of-flight for a pulse of light to travel to the target and back. Another type of lidar system is a frequency-modulated lidar system, which may be referred to as a frequency-modulated continuous-wave (FMCW) lidar system. A FMCW lidar system uses frequency-modulated light to determine the distance to a remote target based on a modulation frequency of the received light (which is scattered from a remote target) relative to the modulation frequency of the emitted light. For example, for a linearly chirped light source (e.g., a frequency modulation that produces a linear change in frequency with time), the larger the frequency difference between the emitted light and the received light, the farther away the target is located. The frequency difference can be determined by mixing the received light with a portion of the emitted light (e.g., by coupling the two beams onto a detector, or mixing analog electric signals corresponding to the received light and the emitted light) and determining the resulting beat frequency. For example, the electrical signal from an APD can be analyzed using a fast Fourier transform (FFT) technique to determine the frequency difference between the emitted light and the received light.

If a linear frequency modulation m (e.g., in units of Hz/s) is applied to a CW laser, then the distance D from the target to the lidar system may be expressed as D=c·Δf/(2 m), where c is the speed of light and Δf is the difference in frequency between the transmitted light and the received light. For example, for a linear frequency modulation of $10^{12}$ Hz/s (or, 1 MHz/µs), if a frequency difference of 330 kHz is measured, then the distance to the target is approximately 50 meters. Additionally, a frequency difference of 1.33 MHz corresponds to a target located approximately 200 meters away.

The light source for a FMCW lidar system can be a fiber laser (e.g., a seed laser diode followed by one or more optical amplifiers) or a direct-emitter laser diode. The seed laser diode or the direct-emitter laser diode can be operated in a CW manner (e.g., by driving the laser diode with a substantially constant DC current), and the frequency modulation can be provided by an external modulator (e.g., an electro-optic phase modulator). Alternatively, the frequency modulation can be produced by applying a DC bias current along with a current modulation to the seed laser diode or the direct-emitter laser diode. The current modulation produces a corresponding refractive-index modulation in the laser diode, which results in a frequency modulation of the light emitted by the laser diode. The current-modulation component (and corresponding frequency modulation) can have any suitable frequency or shape (e.g., piecewise linear, sinusoidal, triangle-wave, or sawtooth).

In some implementations, the output beam of light 125 emitted by the light source 110 is a collimated optical beam with any suitable beam divergence, such as a divergence of approximately 0.1 to 3.0 milliradian (mrad). Divergence of the output beam 125 may refer to an angular measure of an increase in beam size (e.g., a beam radius or beam diameter) as the output beam 125 travels away from the light source 110 or the lidar system 100. The output beam 125 may have a substantially circular cross section with a beam divergence characterized by a single divergence value. For example, the output beam 125 with a circular cross section and a divergence of 1 mrad may have a beam diameter or spot size of approximately 10 cm at a distance of 100 m from the lidar system 100. In some implementations, the output beam 125 may be an astigmatic beam or may have a substantially elliptical cross section and may be characterized by two divergence values. As an example, the output beam 125 may have a fast axis and a slow axis, where the fast-axis divergence is greater than the slow-axis divergence. As another example, the output beam 125 may be an astigmatic beam with a fast-axis divergence of 2 mrad and a slow-axis divergence of 0.5 mrad.

The output beam of light 125 emitted by light source 110 may be unpolarized or randomly polarized, may have no specific or fixed polarization (e.g., the polarization may vary with time), or may have a particular polarization (e.g., the output beam 125 may be linearly polarized, elliptically polarized, or circularly polarized). As an example, the light source 110 may produce linearly polarized light, and the lidar system 100 may include a quarter-wave plate that converts this linearly polarized light into circularly polarized light. The lidar system 100 may transmit the circularly polarized light as the output beam 125, and receive the input beam 135, which may be substantially or at least partially circularly polarized in the same manner as the output beam 125 (e.g., if the output beam 125 is right-hand circularly polarized, then the input beam 135 may also be right-hand circularly polarized). The input beam 135 may pass through the same quarter-wave plate (or a different quarter-wave plate), resulting in the input beam 135 being converted to linearly polarized light which is orthogonally polarized (e.g., polarized at a right angle) with respect to the linearly polarized light produced by light source 110. As another example, the lidar system 100 may employ polarization-diversity detection where two polarization components are detected separately. The output beam 125 may be linearly polarized, and the lidar system 100 may split the input beam 135 into two polarization components (e.g., s-polarization and p-polarization) which are detected separately by two photodiodes (e.g., a balanced photoreceiver that includes two photodiodes).

With continued reference to FIG. 1, the output beam 125 and input beam 135 may be substantially coaxial. In other words, the output beam 125 and input beam 135 may at least partially overlap or share a common propagation axis, so that the input beam 135 and the output beam 125 travel along substantially the same optical path (albeit in opposite directions). As the lidar system 100 scans the output beam 125 across a field of regard, the input beam 135 may follow along with the output beam 125, so that the coaxial relationship between the two beams is maintained.

The lidar system 100 also may include one or more optical components configured to condition, shape, filter, modify, steer, or direct the output beam 125 and/or the input beam 135. For example, lidar system 100 may include one or more lenses, mirrors, filters (e.g., bandpass or interference filters), beam splitters, polarizers, polarizing beam splitters, wave plates (e.g., half-wave or quarter-wave plates), diffractive elements, or holographic elements. In some implementations, lidar system 100 includes a telescope, one or more lenses, or one or more mirrors to expand, focus, or collimate the output beam 125 to a desired beam diameter or divergence. As an example, the lidar system 100 may include one or more lenses to focus the input beam 135 onto an active region of the receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto an active region of receiver 140. As illustrated in FIG. 1, the lidar system 100 may include the mirror 115, which may be a metallic or dielectric mirror. The mirror 115 may be configured so that the light beam 125 passes through the mirror 115. As an example, the mirror 115 may include a hole, slot, or aperture through which the output light beam 125 passes.

As another example, the mirror 115 may be configured so that at least 80% of the output beam 125 passes through the mirror 115 and at least 80% of the input beam 135 is reflected by the mirror 115. In some implementations, the mirror 115 may provide for the output beam 125 and the input beam 135 to be substantially coaxial, so that the beams 125 and 135 travel along substantially the same optical path, in opposite directions.

Although the component 113 in this example implementation includes the overlap mirror 115 through which the output beam 125 travels from the light source 110 toward the scanner 120, in general the component 113 can include a mirror without an aperture so that the output beam 125 travels past the mirror 115 in accordance with off-axis illumination technique, for example. More generally, the component 113 can include any suitable optical elements to direct the output beam 125 toward the scanner 120 and the input beam 135 toward the receiver 140.

Generally speaking, the scanner 120 steers the output beam 125 in one or more directions downrange. The scanner 120 may include one or more scanning mirrors and one or more actuators driving the mirrors to rotate, tilt, pivot, or move the mirrors in an angular manner about one or more axes, for example. For example, the first mirror of the scanner may scan the output beam 125 along a first direction, and the second mirror may scan the output beam 125 along a second direction that is substantially orthogonal to the first direction. Example implementations of the scanner 120 are discussed in more detail below with reference to FIG. 2.

The scanner 120 may be configured to scan the output beam 125 over a 5-degree angular range, 20-degree angular range, 30-degree angular range, 60-degree angular range, or any other suitable angular range. For example, a scanning mirror may be configured to periodically rotate over a 15-degree range, which results in the output beam 125 scanning across a 30-degree range (e.g., a Θ-degree rotation by a scanning mirror results in a 2Θ-degree angular scan of the output beam 125). A field of regard (FOR) of the lidar system 100 may refer to an area, region, or angular range over which the lidar system 100 may be configured to scan or capture distance information. When the lidar system 100 scans the output beam 125 within a 30-degree scanning range, the lidar system 100 may be referred to as having a 30-degree angular field of regard. As another example, a lidar system 100 with a scanning mirror that rotates over a 30-degree range may produce the output beam 125 that scans across a 60-degree range (e.g., a 60-degree FOR). In various implementations, the lidar system 100 may have a FOR of approximately 10°, 20°, 40°, 60°, 120°, or any other suitable FOR. The FOR also may be referred to as a scan region.

The scanner 120 may be configured to scan the output beam 125 horizontally and vertically, and the lidar system 100 may have a particular FOR along the horizontal direction and another particular FOR along the vertical direction. For example, the lidar system 100 may have a horizontal FOR of 10° to 120° and a vertical FOR of 2° to 45°.

The one or more scanning mirrors of the scanner 120 may be communicatively coupled to the controller 150 which may control the scanning mirror(s) so as to guide the output beam 125 in a desired direction downrange or along a desired scan pattern. In general, a scan pattern may refer to a pattern or path along which the output beam 125 is directed, and also may be referred to as an optical scan pattern, optical scan path, or scan path. As an example, the scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. The lidar system 100 can use the scan path to generate a point cloud with pixels that substantially cover the 60°×20° FOR. The pixels may be approximately evenly distributed across the 60°×20° FOR. Alternately, the pixels may have a particular non-uniform distribution (e.g., the pixels may be distributed across all or a portion of the 60°×20° FOR, and the pixels may have a higher density in one or more particular regions of the 60°×20° FOR).

In operation, the light source 110 may emit pulses of light which the scanner 120 scans across a FOR of lidar system 100. The target 130 may scatter one or more of the emitted pulses, and the receiver 140 may detect at least a portion of the pulses of light scattered by the target 130.

The receiver 140 may be referred to as (or may include) a photoreceiver, optical receiver, optical sensor, detector, photodetector, or optical detector. The receiver 140 in some implementations receives or detects at least a portion of the input beam 135 and produces an electrical signal that corresponds to the input beam 135. For example, if the input beam 135 includes an optical pulse, then the receiver 140 may produce an electrical current or voltage pulse that corresponds to the optical pulse detected by the receiver 140. In an example implementation, the receiver 140 includes one or more avalanche photodiodes (APDs) or one or more single-photon avalanche diodes (SPADs). In another implementation, the receiver 140 includes one or more PN photodiodes (e.g., a photodiode structure formed by a p-type semiconductor and a n-type semiconductor) or one or more PIN photodiodes (e.g., a photodiode structure formed by an undoped intrinsic semiconductor region located between p-type and n-type regions).

The receiver 140 may have an active region or an avalanche-multiplication region that includes silicon, germanium, or InGaAs. The active region of receiver 140 may have any suitable size, such as for example, a diameter or width of approximately 50-500 µm. The receiver 140 may include circuitry that performs signal amplification, sampling, filtering, signal conditioning, analog-to-digital conversion, time-to-digital conversion, pulse detection, threshold detection, rising-edge detection, or falling-edge detection. For example, the receiver 140 may include a transimpedance amplifier that converts a received photocurrent (e.g., a current produced by an APD in response to a received optical signal) into a voltage signal. The receiver 140 may direct the voltage signal to pulse-detection circuitry that produces an analog or digital output signal 145 that corresponds to one or more characteristics (e.g., rising edge, falling edge, amplitude, or duration) of a received optical pulse. For example, the pulse-detection circuitry may perform a time-to-digital conversion to produce a digital output signal 145. The receiver 140 may send the electrical output signal 145 to the controller 150 for processing or analysis, e.g., to determine a time-of-flight value corresponding to a received optical pulse.

The controller 150 may be electrically coupled or otherwise communicatively coupled to one or more of the light source 110, the scanner 120, and the receiver 140. The controller 150 may receive electrical trigger pulses or edges from the light source 110, where each pulse or edge corresponds to the emission of an optical pulse by the light source 110. The controller 150 may provide instructions, a control signal, or a trigger signal to the light source 110 indicating when the light source 110 should produce optical pulses. For example, the controller 150 may send an electrical trigger signal that includes electrical pulses, where the light source 110 emits an optical pulse in response to each electrical pulse. Further, the controller 150 may cause the light source 110 to adjust one or more of the frequency, period, duration, pulse energy, peak power, average power, or wavelength of the optical pulses produced by light source 110.

The controller 150 may determine a time-of-flight value for an optical pulse based on timing information associated with when the pulse was emitted by light source 110 and when a portion of the pulse (e.g., the input beam 135) was detected or received by the receiver 140. The controller 150 may include circuitry that performs signal amplification, sampling, filtering, signal conditioning, analog-to-digital conversion, time-to-digital conversion, pulse detection, threshold detection, rising-edge detection, or falling-edge detection.

The controller 150 also can receive signals from one or more sensors 158, which in various implementations are internal to the lidar system 100 or, as illustrated in FIG. 1, external to the lidar system 100. The one or more sensors 158 can include a camera, such as a CCD or CMOS digital camera, microphone or a microphone array, a radar, etc. In some implementations, the lidar system 100 uses signals from the one or more sensors 158 to determine which portion of the field of regard overlaps the ground in front of the lidar system.

As indicated above, the lidar system 100 may be used to determine the distance to one or more downrange targets 130. By scanning the lidar system 100 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. For example, a depth map may cover a field of regard that extends 60° horizontally and 15° vertically, and the depth map may include a frame of 100-2000 pixels in the horizontal direction by 4-400 pixels in the vertical direction.

The lidar system 100 may be configured to repeatedly capture or generate point clouds of a field of regard at any suitable frame rate between approximately 0.1 frames per second (FPS) and approximately 1,000 FPS. For example, the lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. In an example implementation, the lidar system 100 is configured to produce optical pulses at a rate of $5 \times 10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). The point-cloud frame rate may be substantially fixed or dynamically adjustable, depending on the implementation. For example, the lidar system 100 may capture one or more point clouds at a particular frame rate (e.g., 1 Hz) and then switch to capture one or more point clouds at a different frame rate (e.g., 10 Hz). In general, the lidar system can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 100 can overlap, encompass, or enclose at least a portion of the target 130, which may include all or part of an object that is moving or stationary relative to lidar system 100. For example, the target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Figure 2:
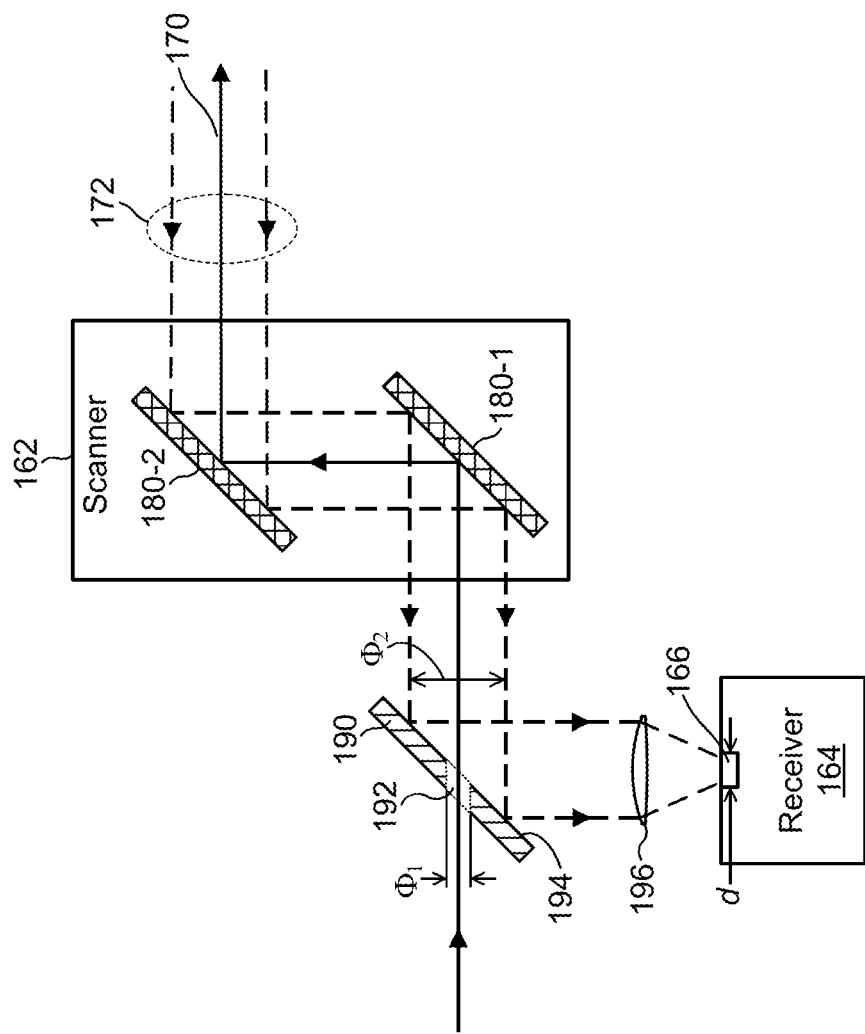
FIG. 2 illustrates in more detail several components that can operate in the system of FIG. 1.

Now referring to FIG. 2, a scanner 162 and a receiver 164 can operate in the lidar system of FIG. 1 as the scanner 120 and the receiver 140, respectively. More generally, the scanner 162 and the receiver 164 can operate in any suitable lidar system.

The scanner 162 may include any suitable number of mirrors driven by any suitable number of mechanical actuators. For example, the scanner 162 may include a galvanometer scanner, a resonant scanner, a piezoelectric actuator, a polygonal scanner, a rotating-prism scanner, a voice coil motor, a DC motor, a brushless DC motor, a stepper motor, or a microelectromechanical systems (MEMS) device, or any other suitable actuator or mechanism.

A galvanometer scanner (which also may be referred to as a galvanometer actuator) may include a galvanometer-based scanning motor with a magnet and coil. When an electrical current is supplied to the coil, a rotational force is applied to the magnet, which causes a mirror attached to the galvanometer scanner to rotate. The electrical current supplied to the coil may be controlled to dynamically change the position of the galvanometer mirror. A resonant scanner (which may be referred to as a resonant actuator) may include a spring-like mechanism driven by an actuator to produce a periodic oscillation at a substantially fixed frequency (e.g., 1 kHz). A MEMS-based scanning device may include a mirror with a diameter between approximately 1 and 10 mm, where the mirror is rotated using electromagnetic or electrostatic actuation. A voice coil motor (which may be referred to as a voice coil actuator) may include a magnet and coil. When an electrical current is supplied to the coil, a translational force is applied to the magnet, which causes a mirror attached to the magnet to move or rotate.

In an example implementation, the scanner 162 includes a single mirror configured to scan an output beam 170 along a single direction (e.g., the scanner 162 may be a one-dimensional scanner that scans along a horizontal or vertical direction). The mirror may be a flat scanning mirror attached to a scanner actuator or mechanism which scans the mirror over a particular angular range. The mirror may be driven by one actuator (e.g., a galvanometer) or two actuators configured to drive the mirror in a push-pull configuration. When two actuators drive the mirror in one direction in a push-pull configuration, the actuators may be located at opposite ends or sides of the mirror. The actuators may operate in a cooperative manner so that when one actuator pushes on the mirror, the other actuator pulls on the mirror, and vice versa. In another example implementation, two voice coil actuators arranged in a push-pull configuration drive a mirror along a horizontal or vertical direction.

In some implementations, the scanner 162 may include one mirror configured to be scanned along two axes, where two actuators arranged in a push-pull configuration provide motion along each axis. For example, two resonant actuators arranged in a horizontal push-pull configuration may drive the mirror along a horizontal direction, and another pair of resonant actuators arranged in a vertical push-pull configuration may drive mirror along a vertical direction. In another example implementation, two actuators scan the output beam 170 along two directions (e.g., horizontal and vertical), where each actuator provides rotational motion along a particular direction or about a particular axis.

The scanner 162 also may include one mirror driven by two actuators configured to scan the mirror along two substantially orthogonal directions. For example, a resonant actuator or a galvanometer actuator may drive one mirror along a substantially horizontal direction, and a galvanometer actuator may drive the mirror along a substantially vertical direction. As another example, two resonant actuators may drive a mirror along two substantially orthogonal directions.

In some implementations, the scanner 162 includes two mirrors, where one mirror scans the output beam 170 along a substantially horizontal direction and the other mirror scans the output beam 170 along a substantially vertical direction. In the example of FIG. 2, the scanner 162 includes two mirrors, a mirror 180-1 and a mirror 180-2. The mirror 180-1 may scan the output beam 170 along a substantially horizontal direction, and the mirror 180-2 may scan the output beam 170 along a substantially vertical direction (or vice versa). Mirror 180-1 or mirror 180-2 may be a flat mirror, a curved mirror, or a polygon mirror with two or more reflective surfaces.

The scanner 162 in other implementations includes two galvanometer scanners driving respective mirrors. For example, the scanner 162 may include a galvanometer actuator that scans the mirror 180-1 along a first direction (e.g., vertical), and the scanner 162 may include another galvanometer actuator that scans the mirror 180-2 along a second direction (e.g., horizontal). In yet another implementation, the scanner 162 includes two mirrors, where a galvanometer actuator drives one mirror, and a resonant actuator drives the other mirror. For example, a galvanometer actuator may scan the mirror 180-1 along a first direction, and a resonant actuator may scan the mirror 180-2 along a second direction. The first and second scanning directions may be substantially orthogonal to one another, e.g., the first direction may be substantially vertical, and the second direction may be substantially horizontal. In yet another implementation, the scanner 162 includes two mirrors, where one mirror is a polygon mirror that is rotated in one direction (e.g., clockwise or counter-clockwise) by an electric motor (e.g., a brushless DC motor). For example, mirror 180-1 may be a polygon mirror that scans the output beam 170 along a substantially horizontal direction, and mirror 180-2 may scan the output beam 170 along a substantially vertical direction. A polygon mirror may have two or more reflective surfaces, and the polygon mirror may be continuously rotated in one direction so that the output beam 170 is reflected sequentially from each of the reflective surfaces. A polygon mirror may have a cross-sectional shape that corresponds to a polygon, where each side of the polygon has a reflective surface. For example, a polygon mirror with a square cross-sectional shape may have four reflective surfaces, and a polygon mirror with a pentagonal cross-sectional shape may have five reflective surfaces.

To direct the output beam 170 along a particular scan pattern, the scanner 162 may include two or more actuators driving a single mirror synchronously. For example, the two or more actuators can drive the mirror synchronously along two substantially orthogonal directions to make the output beam 170 follow a scan pattern with substantially straight lines. In some implementations, the scanner 162 may include two mirrors and actuators driving the two mirrors synchronously to generate a scan pattern that includes substantially straight lines. For example, a galvanometer actuator may drive the mirror 180-2 with a substantially linear back-and-forth motion (e.g., the galvanometer may be driven with a substantially sinusoidal or triangle-shaped waveform) that causes the output beam 170 to trace a substantially horizontal back-and-forth pattern, and another galvanometer actuator may scan the mirror 180-1 along a substantially vertical direction. The two galvanometers may be synchronized so that for every 64 horizontal traces, the output beam 170 makes a single trace along a vertical direction. Whether one or two mirrors are used, the substantially straight lines can be directed substantially horizontally, vertically, or along any other suitable direction.

The scanner 162 also may apply a dynamically adjusted deflection along a vertical direction (e.g., with a galvanometer actuator) as the output beam 170 is scanned along a substantially horizontal direction (e.g., with a galvanometer or resonant actuator) to achieve the straight lines. If a vertical deflection is not applied, the output beam 170 may trace out a curved path as it scans from side to side. In some implementations, the scanner 162 uses a vertical actuator to apply a dynamically adjusted vertical deflection as the output beam 170 is scanned horizontally as well as a discrete vertical offset between each horizontal scan (e.g., to step the output beam 170 to a subsequent row of a scan pattern).

With continued reference to FIG. 2, an overlap mirror 190 in this example implementation is configured to overlap the input beam 172 and output beam 170, so that the beams 170 and 172 are substantially coaxial. In FIG. 2, the overlap mirror 190 includes a hole, slot, or aperture 192 through which the output beam 170 passes, and a reflecting surface 194 that reflects at least a portion of the input beam 172 toward the receiver 164. The overlap mirror 190 may be oriented so that input beam 172 and output beam 170 are at least partially overlapped.

In some implementations, the overlap mirror 190 may not include a hole 192. For example, the output beam 170 may be directed to pass by a side of mirror 190 rather than passing through an aperture 192. The output beam 170 may pass alongside mirror 190 and may be oriented at a slight angle with respect to the orientation of the input beam 172. As another example, the overlap mirror 190 may include a small reflective section configured to reflect the output beam 170, and the rest of the overlap mirror 190 may have an AR coating configured to transmit the input beam 172.

The input beam 172 may pass through a lens 196 which focuses the beam onto an active region 166 of the receiver 164. The active region 166 may refer to an area over which receiver 164 may receive or detect input light. The active region may have any suitable size or diameter d, such as for example, a diameter of approximately 25 µm, 50 µm, 80 µm, 100 µm, 200 µm, 500 µm, 1 mm, 2 mm, or 5 mm. The overlap mirror 190 may have a reflecting surface 194 that is substantially flat or the reflecting surface 194 may be curved (e.g., the mirror 190 may be an off-axis parabolic mirror configured to focus the input beam 172 onto an active region of the receiver 140).

The aperture 192 may have any suitable size or diameter $\Phi_1$, and the input beam 172 may have any suitable size or diameter $\Phi_2$, where $\Phi_2$ is greater than $\Phi_1$. For example, the aperture 192 may have a diameter $\Phi_1$ of approximately 0.2 mm, 0.5 mm, 1 mm, 2 mm, 3 mm, 5 mm, or 10 mm, and the input beam 172 may have a diameter $\Phi_2$ of approximately 2 mm, 5 mm, 10 mm, 15 mm, 20 mm, 30 mm, 40 mm, or 50 mm. In some implementations, the reflective surface 194 of the overlap mirror 190 may reflect 70% or more of input beam 172 toward the receiver 164. For example, if the reflective surface 194 has a reflectivity R at an operating wavelength of the light source 160, then the fraction of input beam 172 directed toward the receiver 164 may be expressed as $R \times [1-(\Phi_1/\Phi_2)^2]$. As a more specific example, if R is 95%, $\Phi_1$ is 2 mm, and $\Phi_2$ is 10 mm, then approximately 91% of the input beam 172 may be directed toward the receiver 164 by the reflective surface 194.

Figure 3:
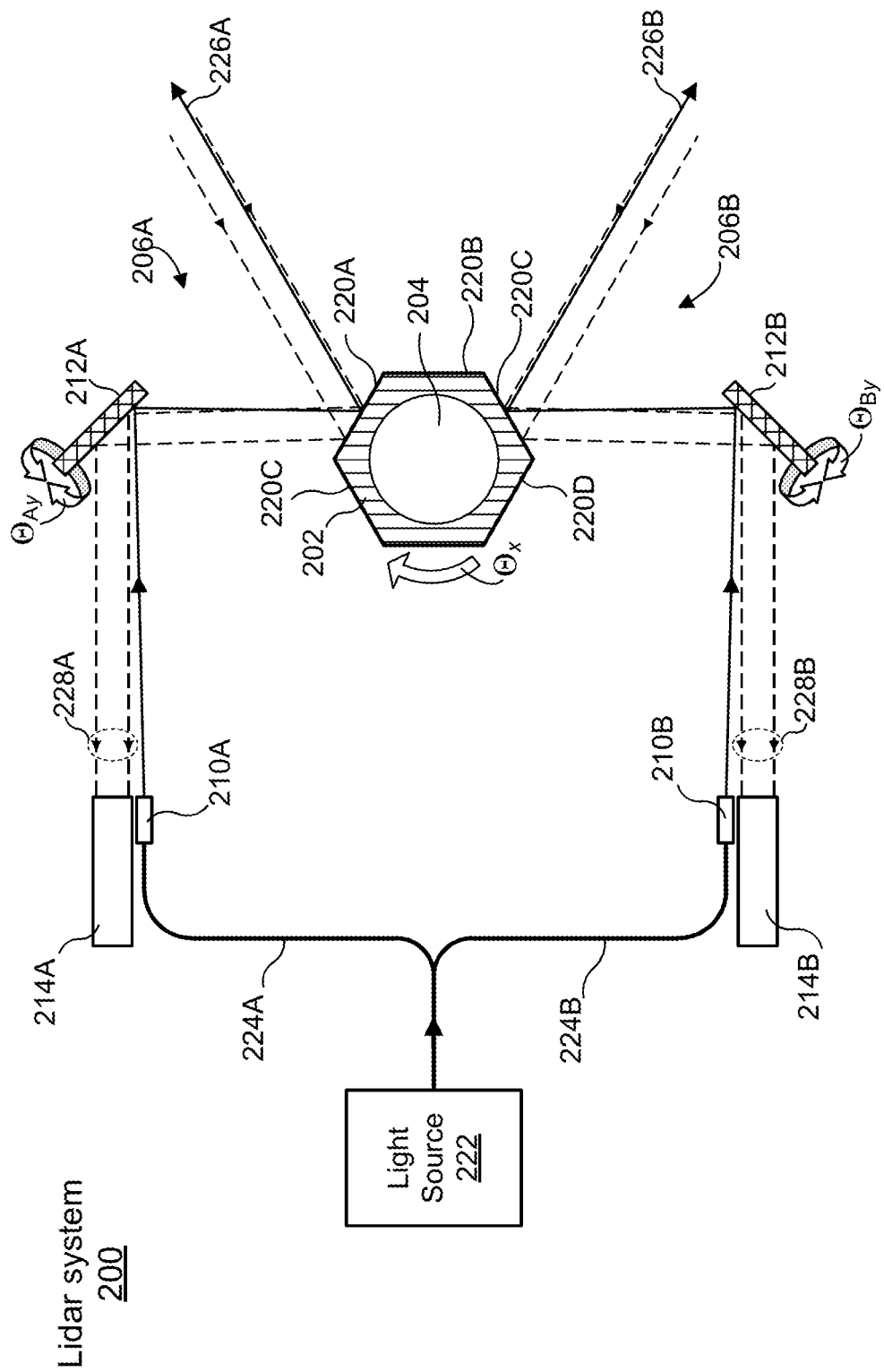
FIG. 3 is a block diagram of lidar system in which the scanner includes a polygon mirror.

FIG. 3 illustrates a lidar system 200 that includes a polygon mirror 202 driven by a motor 204. The lidar system 200 operates in a two-eye configuration, with a first eye 206A and a second eye 206B. The first eye 206A includes a collimator 210A, a scan mirror 212A, and a receiver 214A, and the second eye 206B includes a collimator 210B, a scan mirror 212B, and a receiver 214B. The polygon mirror 202 may be in the form of a rotatable block with multiple reflective surfaces angularly offset from one another along the polygon periphery of the rotatable block. In this example implementation, the polygon mirror 202 has six reflective surfaces 220A, 220B, . . . 220F; however, the polygon mirror 202 in general can include any suitable number of surfaces, e.g., three, four, five, eight, etc. The motor 204 imparts rotation to the rotatable polygon mirror 202. The scan mirrors 212A and 212B are configured to rotate, in an oscillatory manner within a certain angular range, about the respective axis orthogonal to the axis of rotation of the polygon mirror 202.

A light source 222 can be a fiber laser that includes a seed laser diode. The output of the light source 222 can be provided to the collimators 210A and 210B via fiber-optic cables 224A and 224B, free-space coupling, or in any other suitable manner. While the lidar system 200 uses collimators coupled to a shared light source, in other implementations of this system each eye can include its own direct-emitted laser diode. The light source 222 in this case can be made of multiple direct-emitter laser diodes (e.g., high-power laser diodes) that directly emit the pulses without requiring optical amplification. The laser diodes can be housed in the respective sensor heads.

In operation, the collimators 210A and 210B direct output beams 226A and 226B to the scan mirrors 212A and 212B, respectively. The scan mirrors 212A and 212B then reflect these beams toward non-adjacent reflective surfaces of the polygon mirror 202, which then directs the output beams 226A and 226B to respective fields of regard. Input beams 228A and 228B are incident on non-adjacent reflective surfaces of the polygon mirror 202 and are reflected toward the scan mirrors 212A and 212B, respectively. The input beams 228A and 228B then propagate toward the receivers 214A and 214B. In other implementations, input and output beams from different eyes can be incident on adjacent surfaces of the polygon mirror.

Referring back to FIG. 1, the scanner 120 in some implementations includes a polygon mirror similar to the polygon mirror 202 and one or two mirrors similar to the scan mirrors 212A and 212B, depending on the number of eyes of the lidar system. The discussion below refers primarily to the lidar system 100, but it will be understood that, unless explicitly stated otherwise, the techniques for adjusting scan parameters for a ground portion of the field of regard can be implemented in the lidar system 200.

Figure 4:
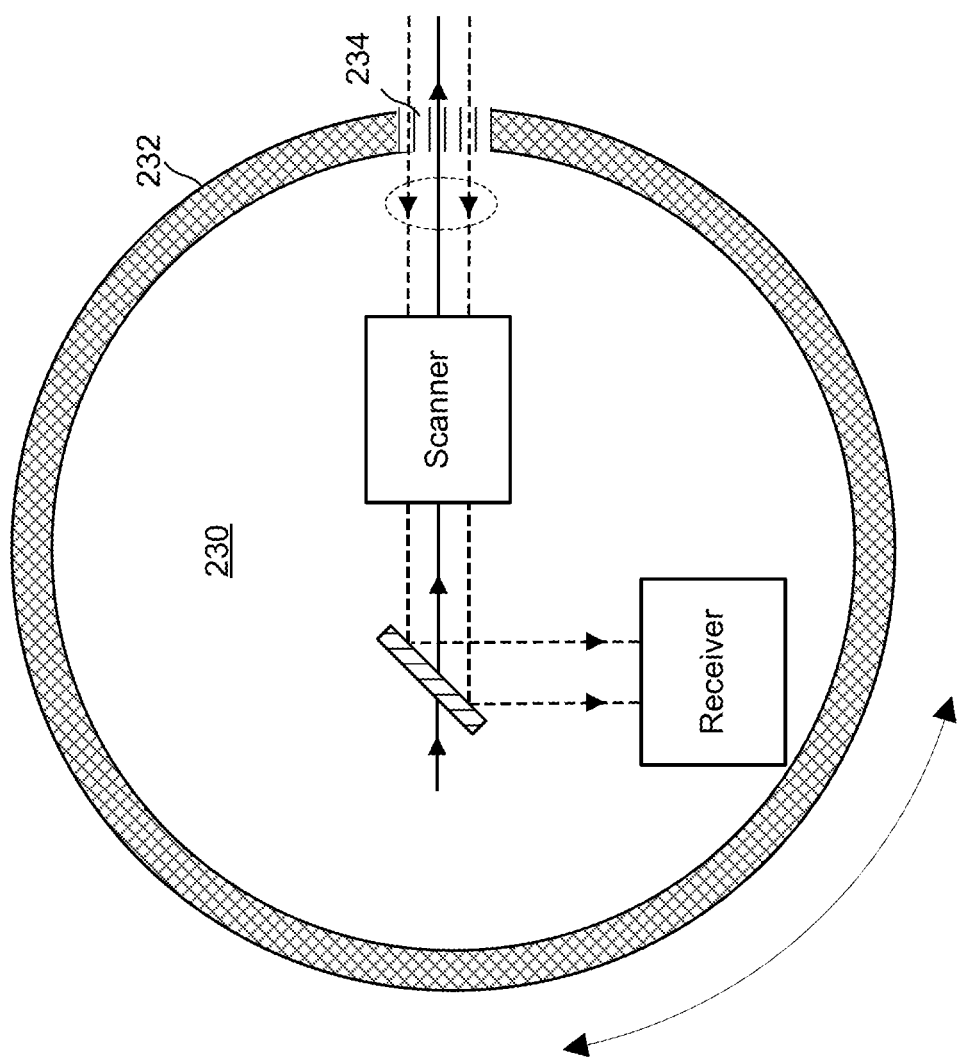
FIG. 4 illustrates an example configuration in which the components of FIG. 1 scan a 360-degree field of regard through a window in a rotating housing.

FIG. 4 illustrates an example configuration in which several components of the lidar system 100 or another suitable system may operate to scan a 360-degree view of regard. Generally speaking, the field of view of a light source in this configuration follows a circular trajectory and accordingly defines a circular scan pattern on a two-dimensional plane. All points on the trajectory remain at the same elevation relative to the ground level, according to one implementation. In this case, separate beams may follow the circular trajectory with certain vertical offsets relative to each other. In another implementation, the points of the trajectory may define a spiral scan pattern in three-dimensional space. A single beam can be sufficient to trace out the spiral scan pattern but, if desired, multiple beams can be used.

In the example of FIG. 3, a rotating scan module 230 revolves around a central axis in one or both directions as indicated. An electric motor may drive the rotating scan module 230 around the central axis at a constant speed, for example. The rotating scan module 230 includes a scanner, a receiver, an overlap mirror, etc. The components of the rotating module 230 may be similar to the scanner 120, the receiver 140, and the overlap mirror 115 discussed above. In some implementations, the rotating scan module 230 also includes a light source and a controller. In other implementations, the light source and/or the controller are disposed apart from the rotating scan module 230 and/or exchange optical and electrical signals with the components of the rotating scan module 230 via corresponding links.

The rotating scan module 230 may include a housing 232 with a window 234. Similar to the window 157 of FIG. 1, the window 234 may be made of glass, plastic, or any other suitable material. The window 234 allows outbound beams as well as return signals to pass through the housing 232. The arc length defined by the window 234 can correspond to any suitable percentage of the circumference of the housing 232. For example, the arc length can correspond to 5%, 20%, 30%, 60%, or possibly even 100% of the circumference.

Figure 5:
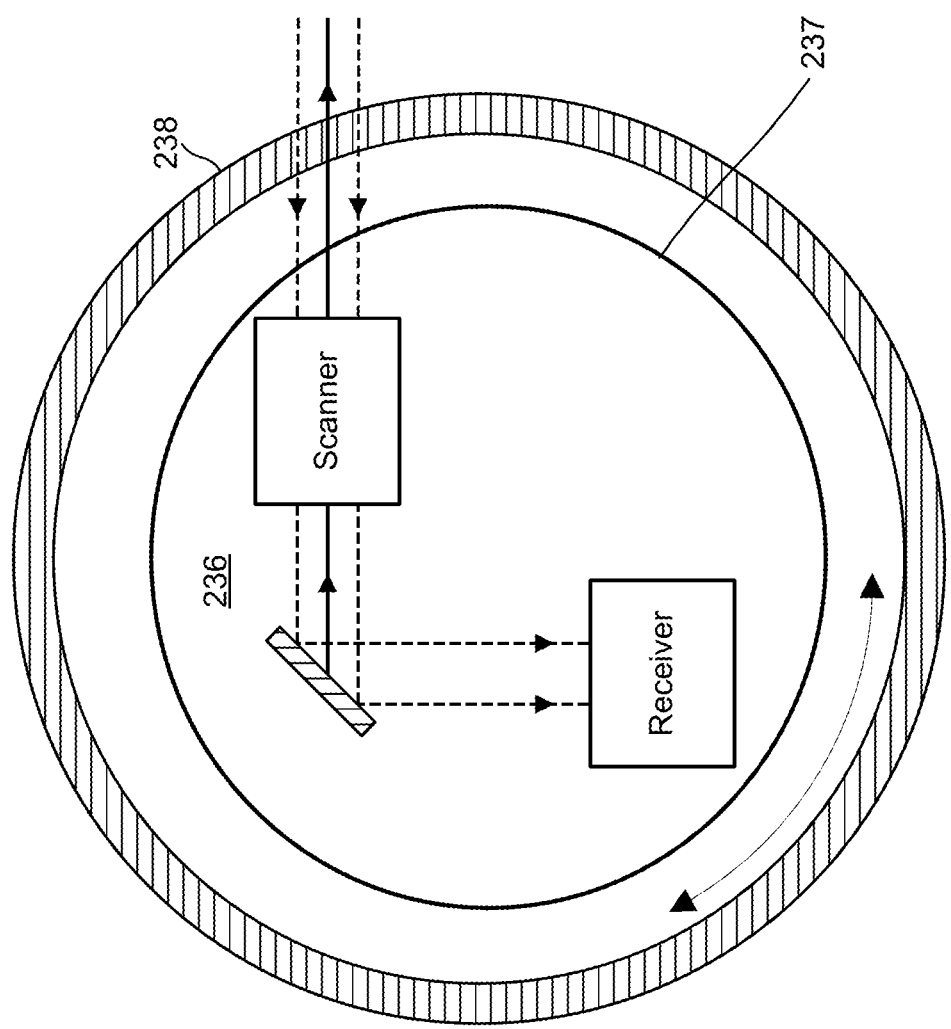
FIG. 5 illustrates another configuration in which the components of FIG. 1 scan a 360-degree field of regard through a substantially transparent stationary housing.

Now referring to FIG. 5, a rotating scan module 236 is generally similar to the rotating scan module 230. In this implementation, however, the components of the rotating scan module 236 are disposed on a platform 237 which rotates inside a stationary circular housing 238. In this implementation, the circular housing 238 is substantially transparent to light at the lidar-system operating wavelength to pass inbound and outbound light signals. The circular housing 238 in a sense defines a circular window similar to the window 234, and may be made of similar material.

One type of lidar system 100 is a pulsed lidar system in which the light source 110 emits pulses of light, and the distance to a remote target 130 is determined from the time-of-flight for a pulse of light to travel to the target 130 and back. Another type of lidar system 100 is a frequency-modulated lidar system, which may be referred to as a frequency-modulated continuous-wave (FMCW) lidar system. A FMCW lidar system uses frequency-modulated light to determine the distance to a remote target 130 based on a modulation frequency of the received light (which is scattered from a remote target) relative to the modulation frequency of the emitted light. For example, for a linearly chirped light source (e.g., a frequency modulation that produces a linear change in frequency with time), the larger the frequency difference between the emitted light and the received light, the farther away the target 130 is located. The frequency difference can be determined by mixing the received light with a portion of the emitted light (e.g., by coupling the two beams onto an APD, or coupling analog electrical signals) and measuring the resulting beat frequency. For example, the electrical signal from an APD can be analyzed using a fast Fourier transform (FFT) technique to determine the difference frequency between the emitted light and the received light.

If a linear frequency modulation m (e.g., in units of Hz/s) is applied to a CW laser, then the distance D from the target 130 to the lidar system 100 may be expressed as $D = c \cdot \Delta f/(2m)$, where c is the speed of light and $\Delta f$ is the difference in frequency between the transmitted light and the received light. For example, for a linear frequency modulation of $10^{12}$ Hz/s (or, 1 MHz/μs), if a frequency difference of 330 kHz is measured, then the distance to the target is approximately 50 meters. Additionally, a frequency difference of 1.33 MHz corresponds to a target located approximately 200 meters away.

The light source 110 for a FMCW lidar system can be a fiber laser (e.g., a seed laser diode followed by one or more optical amplifiers) or a direct-emitter laser diode. The seed laser diode or the direct-emitter laser diode can be operated in a CW manner (e.g., by driving the laser diode with a substantially constant DC current), and the frequency modulation can be provided by an external modulator (e.g., an electro-optic phase modulator). Alternatively, the frequency modulation can be produced by applying a DC bias current along with a current modulation to the seed laser diode or the direct-emitter laser diode. The current modulation produces a corresponding refractive-index modulation in the laser diode, which results in a frequency modulation of the light emitted by the laser diode. The current-modulation component (and corresponding frequency modulation) can have any suitable frequency or shape (e.g., sinusoidal, triangle-wave, or sawtooth).

Generating Pixels within a Field of Regard of the Lidar Systems

Figure 6:
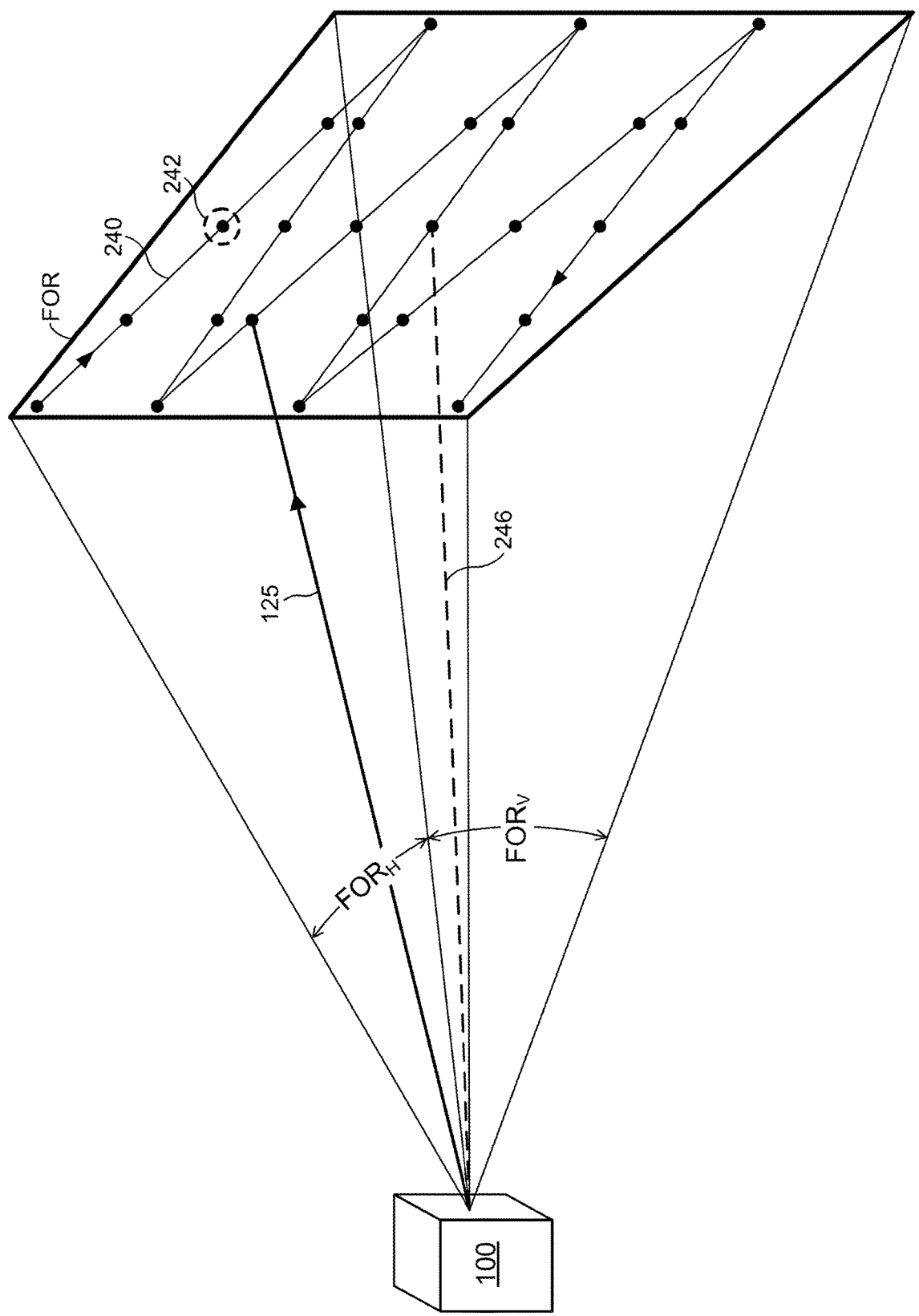
FIG. 6 illustrates an example scan pattern which the lidar system of FIG. 1 can produce when identifying targets within a field of regard.

FIG. 6 illustrates an example scan pattern 240 which the lidar system 100 of FIG. 1 can produce. The lidar system 100 may be configured to scan output optical beam 125 along one or more scan patterns 240. In some implementations, the scan pattern 240 corresponds to a scan across any suitable field of regard (FOR) having any suitable horizontal FOR ($FOR_H$) and any suitable vertical FOR ($FOR_V$). For example, a certain scan pattern may have a field of regard represented by angular dimensions (e.g., $FOR_H \times FOR_V$) 40°×30°, 90°×40°, or 60°×15°. As another example, a certain scan pattern may have a $FOR_H$ greater than or equal to 10°, 25°, 30°, 40°, 60°, 90°, or 120°. As yet another example, a certain scan pattern may have a $FOR_V$ greater than or equal to 2°, 5°, 10°, 15°, 20°, 30°, or 45°. In the example of FIG. 6, reference line 246 represents a center of the field of regard of scan pattern 240. The reference line 246 may have any suitable orientation, such as, a horizontal angle of 0° (e.g., reference line 246 may be oriented straight ahead) and a vertical angle of 0° (e.g., reference line 246 may have an inclination of 0°), or the reference line 246 may have a nonzero horizontal angle or a nonzero inclination (e.g., a vertical angle of +10° or −10°). In FIG. 6, if the scan pattern 240 has a 60°×15° field of regard, then the scan pattern 240 covers a ±30° horizontal range with respect to reference line 246 and a ±7.5° vertical range with respect to reference line 246. Additionally, the optical beam 125 in FIG. 6 has an orientation of approximately −15° horizontal and +3° vertical with respect to reference line 246. The beam 125 may be referred to as having an azimuth of −15° and an altitude of +3° relative to the reference line 246. An azimuth (which may be referred to as an azimuth angle) may represent a horizontal angle with respect to the reference line 246, and an altitude (which may be referred to as an altitude angle, elevation, or elevation angle) may represent a vertical angle with respect to the reference line 246.

The scan pattern 240 may include multiple pixels 242, and each pixel 242 may be associated with one or more laser pulses and one or more corresponding distance measurements. A cycle of scan pattern 240 may include a total of $P_x \times P_y$ pixels 242 (e.g., a two-dimensional distribution of $P_x$ by $P_y$ pixels). For example, the scan pattern 240 may include a distribution with dimensions of approximately 100-2,000 pixels 242 along a horizontal direction and approximately 4-400 pixels 242 along a vertical direction. As another example, the scan pattern 240 may include a distribution of 1,000 pixels 242 along the horizontal direction by 64 pixels 242 along the vertical direction (e.g., the frame size is 1000×64 pixels) for a total of 64,000 pixels per cycle of scan pattern 240. The number of pixels 242 along a horizontal direction may be referred to as a horizontal resolution or pixel density of the scan pattern 240, and the number of pixels 242 along a vertical direction may be referred to as a vertical resolution or pixel density of the scan pattern 240. As an example, the scan pattern 240 may have a horizontal resolution of greater than or equal to 100 pixels 242 and a vertical resolution of greater than or equal to 4 pixels 242. As another example, the scan pattern 240 may have a horizontal resolution of 100-2,000 pixels 242 and a vertical resolution of 4-400 pixels 242.

Each pixel 242 may be associated with a distance (e.g., a distance to a portion of a target 130 from which the corresponding laser pulse was scattered) or one or more angular values. As an example, the pixel 242 may be associated with a distance value and two angular values (e.g., an azimuth and altitude) that represent the angular location of the pixel 242 with respect to the lidar system 100. A distance to a portion of the target 130 may be determined based at least in part on a time-of-flight measurement for a corresponding pulse. An angular value (e.g., an azimuth or altitude) may correspond to an angle (e.g., relative to reference line 246) of the output beam 125 (e.g., when a corresponding pulse is emitted from lidar system 100) or an angle of the input beam 135 (e.g., when an input signal is received by lidar system 100). In some implementations, the lidar system 100 determines an angular value based at least in part on a position of a component of the scanner 120. For example, an azimuth or altitude value associated with the pixel 242 may be determined from an angular position of one or more corresponding scanning mirrors of the scanner 120.

In some implementations, the lidar system 100 concurrently directs multiple beams across the field of regard. In the example implementation of FIG. 7, the lidar system generates output beams 250A, 250B, 250C, . . . 250N etc., each of which follows a linear scan pattern 254A, 254B, 254C, . . . 254N. The number of parallel lines can be 2, 4, 12, 20, or any other suitable number. The lidar system 100 may angularly separate the beams 250A, 250B, 250C, . . . 250N, so that, for example, the separation between beams 250A and 250B at a certain distance may be 30 cm, and the separation between the same beams 250A and 250B at a longer distance may be 50 cm.

Figure 7:
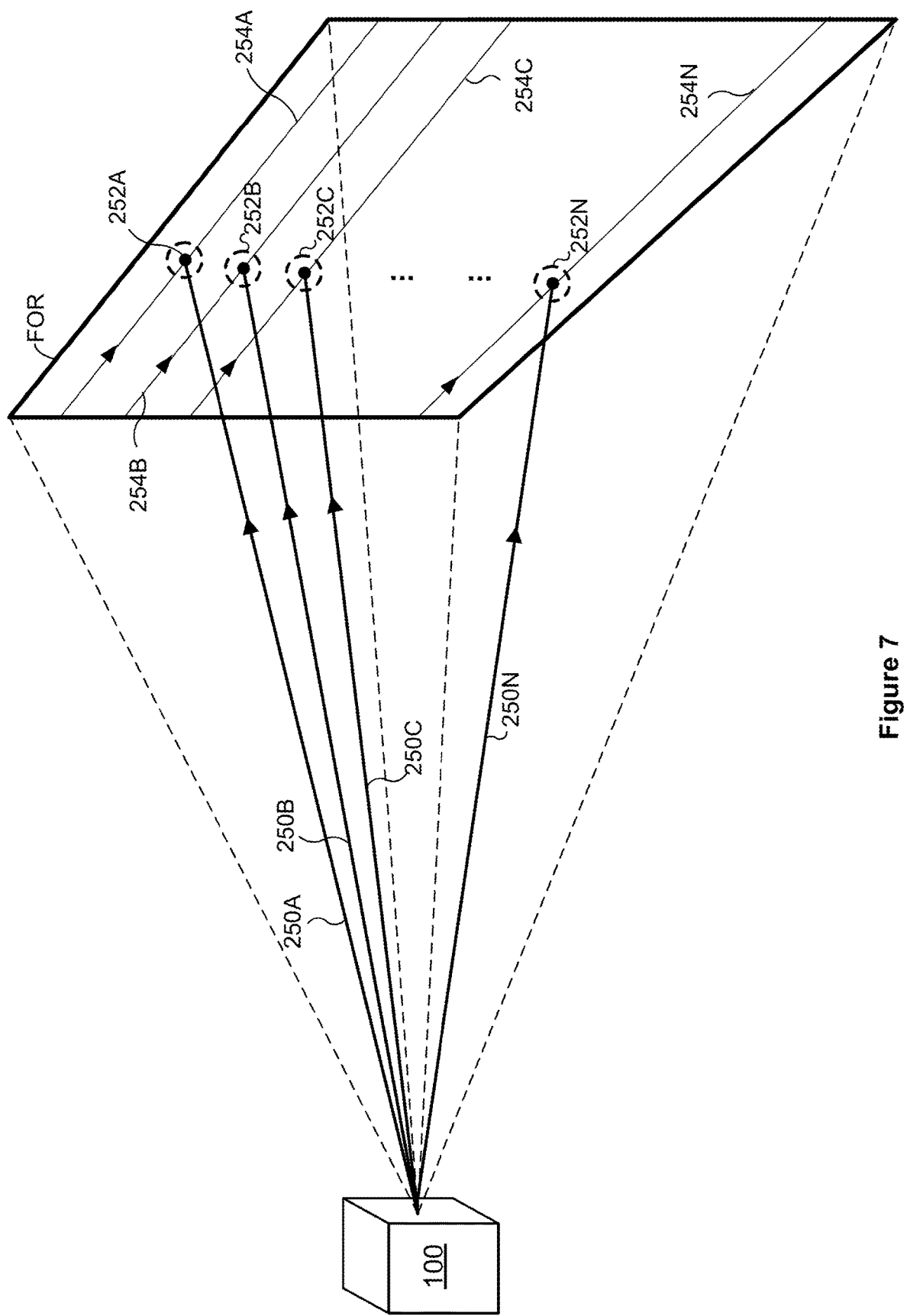
FIG. 7 illustrates an example scan pattern which the lidar system of FIG. 1 can produce when identifying targets within a field of regard using multiple beams.

Similar to the scan pattern 240, each of the linear scan patterns 254A-N includes pixels associated with one or more laser pulses and distance measurements. FIG. 7 illustrates example pixels 252A, 252B and 252C along the scan patterns 254A, 254B and 254C, respectively. The lidar system 100 in this example may generate the values for the pixels 252A-252N at the same time, thus increasing the rate at which values for pixels are determined.

Depending on the implementation, the lidar system 100 may output the beams 250A-N at the same wavelength or different wavelengths. The beam 250A for example may have the wavelength of 1540 nm, the beam 250B may have the wavelength of 1550 nm, the beam 250C may have the wavelength of 1560 nm, etc. The number of different wavelengths the lidar system 100 uses need not match the number of beams. Thus, the lidar system 100 in the example implementation of FIG. 7 may use M wavelengths with N beams, where 1≤M≤N.

Figure 8:
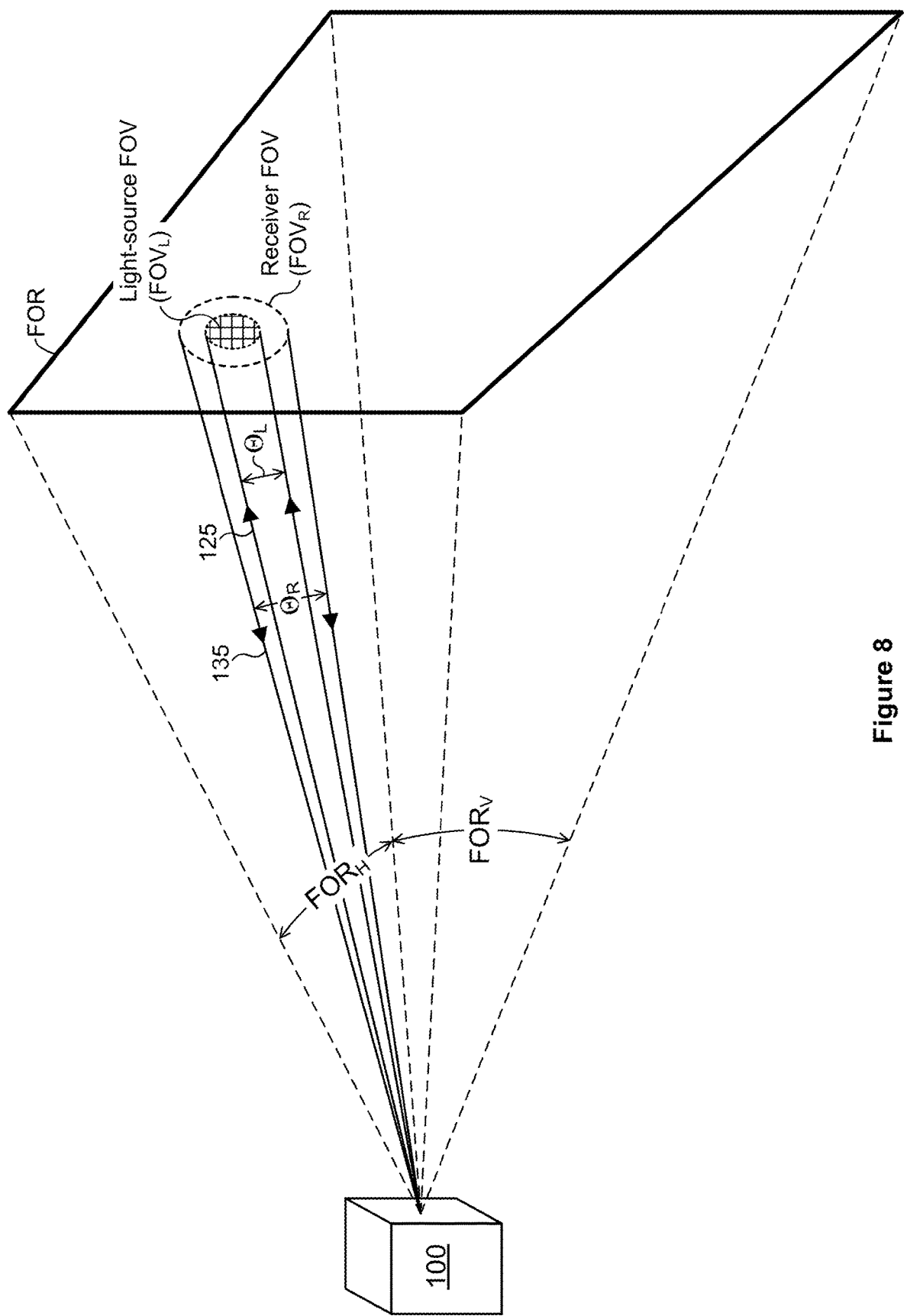
FIG. 8 schematically illustrates fields of view (FOVs) of a light source and a detector that can operate in the lidar system of FIG. 1.

Next, FIG. 8 illustrates an example light-source field of view ($FOV_L$) and receiver field of view ($FOV_R$) for the lidar system 100. The light source 110 may emit pulses of light as the $FOV_L$ and $FOV_R$ are scanned by the scanner 120 across a field of regard (FOR). The light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. For example, as the scanner 120 scans the light-source field of view across a field of regard, the lidar system 100 may send the pulse of light in the direction the $FOV_L$ is pointing at the time the light source 110 emits the pulse. The pulse of light may scatter off the target 130, and the receiver 140 may receive and detect a portion of the scattered light that is directed along or contained within the $FOV_R$.

An instantaneous FOV may refer to an angular cone being illuminated by a pulse directed along the direction the light-source FOV is pointing at the instant the pulse of light is emitted. Thus, while the light-source FOV and the detector FOV are scanned together in a synchronous manner (e.g., the scanner 120 scans both the light-source FOV and the detector FOV across the field of regard along the same scan direction and at the same scan speed, maintaining the same relative position to each other), the instantaneous FOV remains "stationary," and the detector FOV effectively moves relative to the instantaneous FOV. More particularly, when a pulse of light is emitted, the scanner 120 directs the pulse along the direction in which the light-source FOV currently is pointing. Each instantaneous FOV (IFOV) corresponds to a pixel. Thus, each time a pulse is emitted, the lidar system 100 produces or defines an IFOV (or pixel) that is fixed in place and corresponds to the light-source FOV at the time when the pulse is emitted. During operation of the scanner 120, the detector FOV moves relative to the light-source IFOV but does not move relative to the light-source FOV.

In some implementations, the scanner 120 is configured to scan both a light-source field of view and a receiver field of view across a field of regard of the lidar system 100. The lidar system 100 may emit and detect multiple pulses of light as the scanner 120 scans the $FOV_L$ and $FOV_R$ across the field of regard while tracing out the scan pattern 240. The scanner 120 in some implementations scans the light-source field of view and the receiver field of view synchronously with respect to one another. In this case, as the scanner 120 scans $FOV_L$ across a scan pattern 240, the $FOV_R$ follows substantially the same path at the same scanning speed. Additionally, the $FOV_L$ and $FOV_R$ may maintain the same relative position to one another as the scanner 120 scans $FOV_L$ and $FOV_R$ across the field of regard. For example, the $FOV_L$ may be substantially overlapped with or centered inside the $FOV_R$ (as illustrated in FIG. 8), and the scanner 120 may maintain this relative positioning between $FOV_L$ and $FOV_R$ throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

The $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. The receiver field of view may be any suitable size relative to the light-source field of view. For example, the receiver field of view may be smaller than, substantially the same size as, or larger than the angular extent of the light-source field of view. In some implementations, the light-source field of view has an angular extent of less than or equal to 50 milliradians, and the receiver field of view has an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. The light-source field of view and the receiver field of view may have approximately equal angular extents. As an example, $\Theta_L$ and $\Theta_R$ may both be approximately equal to 1 mrad, 2 mrad, or 3 mrad. In some implementations, the receiver field of view is larger than the light-source field of view, or the light-source field of view is larger than the receiver field of view. For example, $\Theta_L$ may be approximately equal to 1.5 mrad, and $\Theta_R$ may be approximately equal to 3 mrad.

A pixel 242 may represent or correspond to a light-source field of view. As the output beam 125 propagates from the light source 110, the diameter of the output beam 125 (as well as the size of the corresponding pixel 242) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 242 may also have a corresponding size or diameter of approximately 20 cm. At a distance of 200 m from the lidar system 100, the output beam 125 and the corresponding pixel 242 may each have a diameter of approximately 40 cm.

A Lidar System Operating in a Vehicle

As indicated above, one or more lidar systems 100 may be integrated into a vehicle. In one example implementation, multiple lidar systems 100 may be integrated into a car to provide a complete 360-degree horizontal FOR around the car. As another example, 4-10 lidar systems 100, each system having a 45-degree to 90-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-15 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

In some implementations, one or more lidar systems 100 are included in a vehicle as part of an advanced driver assistance system (ADAS) to assist a driver of the vehicle in the driving process. For example, a lidar system 100 may be part of an ADAS that provides information or feedback to a driver (e.g., to alert the driver to potential problems or hazards) or that automatically takes control of part of a vehicle (e.g., a braking system or a steering system) to avoid collisions or accidents. The lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In some cases, one or more lidar systems 100 are integrated into a vehicle as part of an autonomous-vehicle driving system. In an example implementation, the lidar system 100 provides information about the surrounding environment to a driving system of an autonomous vehicle. An autonomous-vehicle driving system may include one or more computing systems that receive information from the lidar system 100 about the surrounding environment, analyze the received information, and provide control signals to the vehicle's driving systems (e.g., steering wheel, accelerator, brake, or turn signal). For example, the lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if the lidar system 100 detects a vehicle ahead that is slowing down or stopping, the autonomous-vehicle driving system may send instructions to release the accelerator and apply the brakes.

An autonomous vehicle may be referred to as an autonomous car, driverless car, self-driving car, robotic car, or unmanned vehicle. An autonomous vehicle may be a vehicle configured to sense its environment and navigate or drive with little or no human input. For example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

An autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In some implementations, a light source of a lidar system is located remotely from some of the other components of the lidar system such as the scanner and the receiver. Moreover, a lidar system implemented in a vehicle may include fewer light sources than scanners and receivers.

Figure 9:
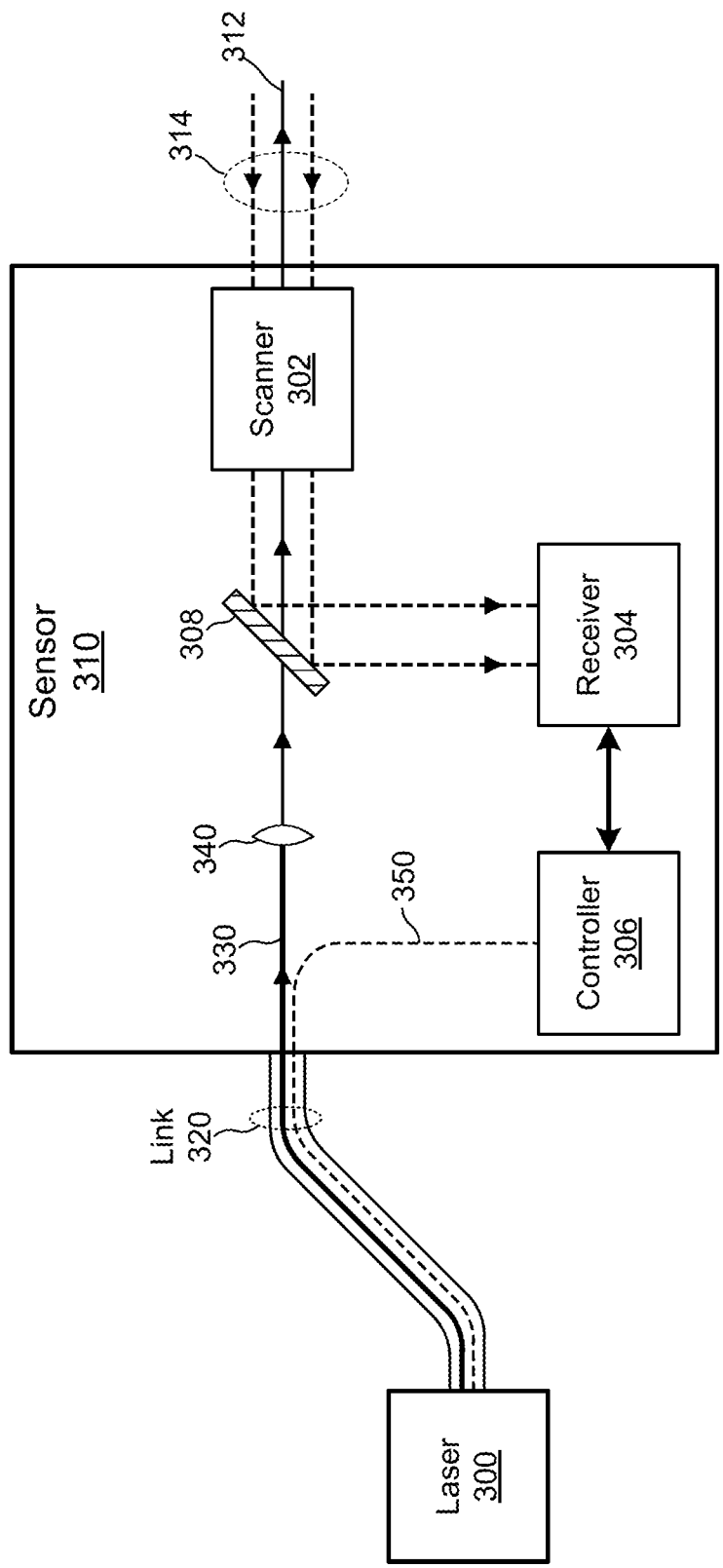
FIG. 9 illustrates an example configuration of the lidar system of FIG. 1 or another suitable lidar system, in which a laser is disposed away from sensor components.

FIG. 9 illustrates an example configuration in which a laser-sensor link 320 includes an optical link 330 and an electrical link 350 coupled between a laser 300 and a sensor 310. The laser 300 may be configured to emit pulses of light and may be referred to as a laser system, laser head, or light source. The laser 300 may include, may be part of, may be similar to, or may be substantially the same as the light source 110 illustrated in FIG. 1 and discussed above. Further, the scanner 302, the receiver 304, the controller 306, and the mirror 308 may be similar to the scanner 120, the receiver 140, the controller 150, and the mirror 115 discussed above. In the example of FIG. 9, the laser 300 is coupled to the remotely located sensor 310 by a laser-sensor link 320 (which may be referred to as a link). The sensor 310 may be referred to as a sensor head and may include the mirror 308, the scanner 302, the receiver 304, and the controller 306. In an example implementation, the laser 300 includes a pulsed laser diode (e.g., a pulsed DFB laser) followed by an optical amplifier, and light from the laser 300 is conveyed by an optical fiber of the laser-sensor link 320 of a suitable length to the scanner 120 in a remotely located sensor 310.

The laser-sensor link 320 may include any suitable number of optical links 330 (e.g., 0, 1, 2, 3, 5, or 10) and any suitable number of electrical links 350 (e.g., 0, 1, 2, 3, 5, or 10). In the example configuration depicted in FIG. 9, the laser-sensor link 320 includes one optical link 330 from the laser 300 to an output collimator 340 and one electrical link 350 that connects the laser 300 to the controller 150. The optical link 330 may include optical fiber (which may be referred to as fiber-optic cable or fiber) that conveys, carries, transports, or transmits light between the laser 300 and the sensor 310. The optical fiber may be, for example, single-mode (SM) fiber, multi-mode (MM) fiber, large-mode-area (LMA) fiber, polarization-maintaining (PM) fiber, photonic-crystal or photonic-bandgap fiber, gain fiber (e.g., rare-earth-doped optical fiber for use in an optical amplifier), or any suitable combination thereof. The output collimator 340 receives optical pulses conveyed from the laser 300 by the optical link 330 and produces a free-space optical beam 312 that includes the optical pulses. The output collimator 340 directs the free-space optical beam 312 through the mirror 308 and to the scanner 302.

The electrical link 350 may include electrical wire or cable (e.g., a coaxial cable or twisted-pair cable) that conveys or transmits electrical power and/or one or more electrical signals between the laser 300 and the sensor 310. For example, the laser 300 may include a power supply or a power conditioner that provides electrical power to the laser 300, and additionally, the power supply or power conditioner may provide power to one or more components of the sensor 310 (e.g., the scanner 304, the receiver 304, and/or the controller 306) via the one or more electrical links 350. The electrical link 350 in some implementations may convey electrical signals that include data or information in analog or digital format. Further, the electrical link 350 may provide an interlock signal from the sensor 310 to the laser 300. If the controller 306 detects a fault condition indicating a problem with the sensor 310 or the overall lidar system, the controller 306 may change a voltage on the interlock line (e.g., from 5 V to 0 V) indicating that the laser 300 should shut down, stop emitting light, or reduce the power or energy of emitted light. A fault condition may be triggered by a failure of the scanner 302, a failure of the receiver 304, or by a person or object coming within a threshold distance of the sensor 310 (e.g., within 0.1 m, 0.5 m, 1 m, 5 m, or any other suitable distance).

As discussed above, a lidar system can include one or more processors to determine a distance D to a target. In the implementation illustrated in FIG. 9, the controller 306 may be located in the laser 300 or in the sensor 310, or parts of the controller 150 may be distributed between the laser 300 and the sensor 310. In an example implementation, each sensor head 310 of a lidar system includes electronics (e.g., an electronic filter, transimpedance amplifier, threshold detector, or time-to-digital (TDC) converter) configured to receive or process a signal from the receiver 304 or from an APD or SPAD of the receiver 304. Additionally, the laser 300 may include processing electronics configured to determine a time-of-flight value or a distance to the target based on a signal received from the sensor head 310 via the electrical link 350.

Figure 10:
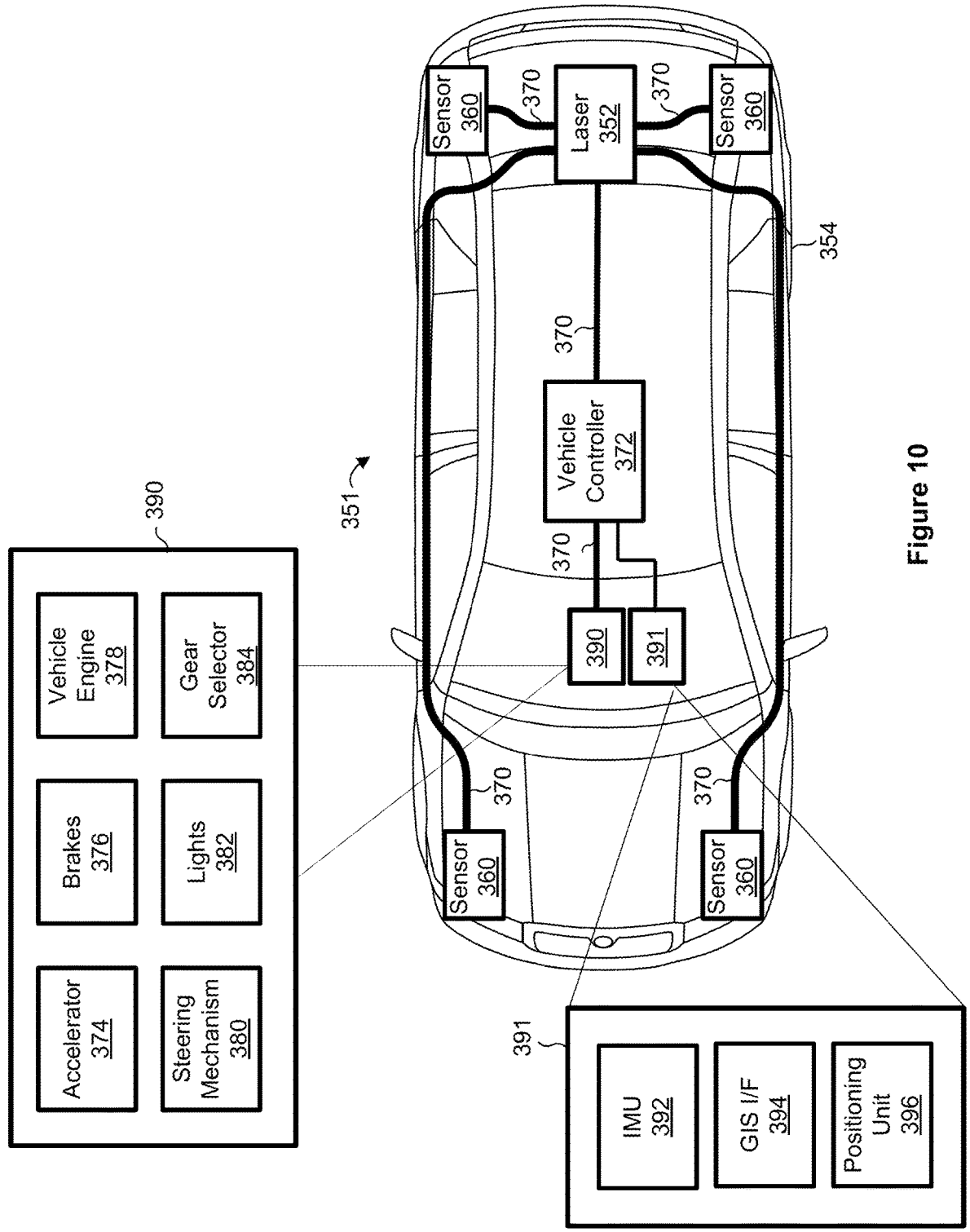
FIG. 10 illustrates an example vehicle in which the lidar system of FIG. 1 can operate.

Next, FIG. 10 illustrates an example vehicle 354 with a lidar system 351 that includes a laser 352 with multiple sensor heads 360 coupled to the laser 352 via multiple laser-sensor links 370. The laser 352 and the sensor heads 360 may be similar to the laser 300 and the sensor 310 discussed above, in some implementations. For example, each of the laser-sensor links 370 may include one or more optical links and/or one or more electrical links. The sensor heads 360 in FIG. 10 are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads may be attached to or incorporated into a bumper, fender, grill, side panel, spoiler, roof, headlight assembly, taillight assembly, rearview mirror assembly, hood, trunk, window, or any other suitable part of the vehicle.

In the example of FIG. 10, four sensor heads 360 are positioned at or near the four corners of the vehicle (e.g., the sensor heads may be incorporated into a light assembly, side panel, bumper, or fender), and the laser 352 may be located within the vehicle (e.g., in or near the trunk). The four sensor heads 360 may each provide a 90° to 120° horizontal field of regard (FOR), and the four sensor heads 360 may be oriented so that together they provide a complete 360-degree view around the vehicle. As another example, the lidar system 351 may include six sensor heads 360 positioned on or around a vehicle, where each of the sensor heads 360 provides a 60° to 90° horizontal FOR. As another example, the lidar system 351 may include eight sensor heads 360, and each of the sensor heads 360 may provide a 45° to 60° horizontal FOR. As yet another example, the lidar system 351 may include six sensor heads 360, where each of the sensor heads 360 provides a 70° horizontal FOR with an overlap between adjacent FORs of approximately 10°. As another example, the lidar system 351 may include two sensor heads 360 which together provide a horizontal FOR of greater than or equal to 30°.

Data from each of the sensor heads 360 may be combined or stitched together to generate a point cloud that covers a greater than or equal to 30-degree horizontal view around a vehicle. For example, the laser 352 may include a controller or processor that receives data from each of the sensor heads 360 (e.g., via a corresponding electrical link 370) and processes the received data to construct a point cloud covering a 360-degree horizontal view around a vehicle or to determine distances to one or more targets. The point cloud or information from the point cloud may be provided to a vehicle controller 372 via a corresponding electrical, optical, or radio link 370. In some implementations, the point cloud is generated by combining data from each of the multiple sensor heads 360 at a controller included within the laser 352 and provided to the vehicle controller 372. In other implementations, each of the sensor heads 360 includes a controller or process that constructs a point cloud for a portion of the 360-degree horizontal view around the vehicle and provides the respective point cloud to the vehicle controller 372. The vehicle controller 372 then combines or stitches together the points clouds from the respective sensor heads 360 to construct a combined point cloud covering a 360-degree horizontal view. Still further, the vehicle controller 372 in some implementations communicates with a remote server to process point cloud data.

In any event, the vehicle 354 may be an autonomous vehicle where the vehicle controller 372 provides control signals to various components 390 within the vehicle 354 to maneuver and otherwise control operation of the vehicle 354. The components 390 are depicted in an expanded view in FIG. 10 for ease of illustration only. The components 390 may include an accelerator 374, brakes 376, a vehicle engine 378, a steering mechanism 380, lights 382 such as brake lights, head lights, reverse lights, emergency lights, etc., a gear selector 384, and/or other suitable components that effectuate and control movement of the vehicle 354. The gear selector 384 may include the park, reverse, neutral, drive gears, etc. Each of the components 390 may include an interface via which the component receives commands from the vehicle controller 372 such as "increase speed," "decrease speed," "turn left 5 degrees," "activate left turn signal," etc. and, in some cases, provides feedback to the vehicle controller 372.

In some implementations, the vehicle controller 372 receives point cloud data from the laser 352 or sensor heads 360 via the link 370 and analyzes the received point cloud data to sense or identify targets 130 and their respective locations, distances, speeds, shapes, sizes, type of target (e.g., vehicle, human, tree, animal), etc. The vehicle controller 372 then provides control signals via the link 370 to the components 390 to control operation of the vehicle based on the analyzed information. For example, the vehicle controller 372 may identify an intersection based on the point cloud data and determine that the intersection is the appropriate location at which to make a left turn. Accordingly, the vehicle controller 372 may provide control signals to the steering mechanism 380, the accelerator 374, and brakes 376 for making a proper left turn. In another example, the vehicle controller 372 may identify a traffic light based on the point cloud data and determine that the vehicle 354 needs to come to a stop. As a result, the vehicle controller 372 may provide control signals to release the accelerator 374 and apply the brakes 376.

In addition to the components 390, the vehicle 354 may be equipped with sensors and remote system interfaces 391, which can be communicatively coupled to the vehicle controller 372. The components 391 can include an Inertial Measurement Unit (IMU) 392, a Geographic Information System (GIS) interface 304 for obtaining mapping data from a remote server via a communication network, a positioning unit 396 such as a Global Positioning Service (GPS) receiver, etc. The vehicle controller 372 in some cases provides data from the components 391 to the lidar system 351.

Example Receiver Implementation

Figure 11:
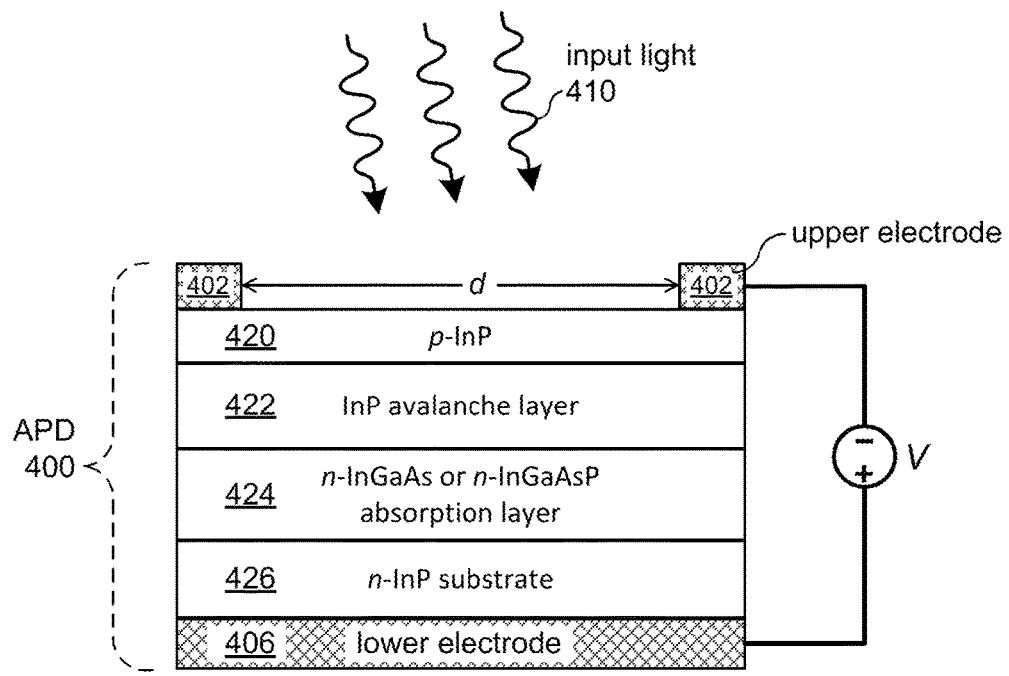
FIG. 11 illustrates an example InGaAs avalanche photodiode which can operate in the lidar system of FIG. 1.

FIG. 11 illustrates an example InGaAs avalanche photodiode (APD) 400. Referring back to FIG. 1, the receiver 140 may include one or more APDs 400 configured to receive and detect light from input light such as the beam 135. More generally, the APD 400 can operate in any suitable receiver of input light. The APD 400 may be configured to detect a portion of pulses of light which are scattered by a target located downrange from the lidar system in which the APD 400 operates. For example, the APD 400 may receive a portion of a pulse of light scattered by the target 130 depicted in FIG. 1, and generate an electrical-current signal corresponding to the received pulse of light.

The APD 400 may include doped or undoped layers of any suitable semiconductor material, such as for example, silicon, germanium, InGaAs, InGaAsP, or indium phosphide (InP). Additionally, the APD 400 may include an upper electrode 402 and a lower electrode 406 for coupling the ADP 400 to an electrical circuit. The APD 400 for example may be electrically coupled to a voltage source that supplies a reverse-bias voltage V to the APD 400. Additionally, the APD 400 may be electrically coupled to a transimpedance amplifier which receives electrical current generated by the APD 400 and produces an output voltage signal that corresponds to the received current. The upper electrode 402 or lower electrode 406 may include any suitable electrically conductive material, such as for example a metal (e.g., gold, copper, silver, or aluminum), a transparent conductive oxide (e.g., indium tin oxide), a carbon-nanotube material, or polysilicon. In some implementations, the upper electrode 402 is partially transparent or has an opening to allow input light 410 to pass through to the active region of the APD 400. In FIG. 11, the upper electrode 402 may have a ring shape that at least partially surrounds the active region of the APD 400, where the active region refers to an area over which the APD 400 may receive and detect the input light 410. The active region may have any suitable size or diameter d, such as for example, a diameter of approximately 25 μm, 50 μm, 80 μm, 100 μm, 200 μm, 500 μm, 1 mm, 2 mm, or 5 mm.

The APD 400 may include any suitable combination of any suitable semiconductor layers having any suitable doping (e.g., n-doped, p-doped, or intrinsic undoped material). In the example of FIG. 11, the InGaAs APD 400 includes a p-doped InP layer 420, an InP avalanche layer 422, an absorption layer 424 with n-doped InGaAs or InGaAsP, and an n-doped InP substrate layer 426. Depending on the implementation, the APD 400 may include separate absorption and avalanche layers, or a single layer may act as both an absorption and avalanche region. The APD 400 may operate electrically as a PN diode or a PIN diode, and, during operation, the APD 400 may be reverse-biased with a positive voltage V applied to the lower electrode 406 with respect to the upper electrode 402. The applied reverse-bias voltage V may have any suitable value, such as for example approximately 5 V, 10 V, 20 V, 30 V, 50 V, 75 V, 100 V, or 200 V.

In FIG. 11, photons of the input light 410 may be absorbed primarily in the absorption layer 424, resulting in the generation of electron-hole pairs (which may be referred to as photo-generated carriers). For example, the absorption layer 424 may be configured to absorb photons corresponding to the operating wavelength of the lidar system 100 (e.g., any suitable wavelength between approximately 1400 nm and approximately 1600 nm). In the avalanche layer 422, an avalanche-multiplication process occurs where carriers (e.g., electrons or holes) generated in the absorption layer 424 collide with the semiconductor lattice of the absorption layer 424, and produce additional carriers through impact ionization. This avalanche process can repeat numerous times so that one photo-generated carrier may result in the generation of multiple carriers. As an example, a single photon absorbed in the absorption layer 424 may lead to the generation of approximately 10, 50, 100, 200, 500, 1000, 10,000, or any other suitable number of carriers through an avalanche-multiplication process. The carriers generated in an APD 400 may produce an electrical current that is coupled to an electrical circuit which may perform signal amplification, sampling, filtering, signal conditioning, analog-to-digital conversion, time-to-digital conversion, pulse detection, threshold detection, rising-edge detection, or falling-edge detection.

The number of carriers generated from a single photo-generated carrier may increase as the applied reverse bias V is increased. If the applied reverse bias V is increased above a particular value referred to as the APD breakdown voltage, then a single carrier can trigger a self-sustaining avalanche process (e.g., the output of the APD 400 is saturated regardless of the input light level). The APD 400 that is operated at or above a breakdown voltage may be referred to as a single-photon avalanche diode (SPAD) and may be referred to as operating in a Geiger mode or a photon-counting mode. The APD 400 that is operated below a breakdown voltage may be referred to as a linear APD, and the output current generated by the APD 400 may be sent to an amplifier circuit (e.g., a transimpedance amplifier). The receiver 140 (see FIG. 1) may include an APD configured to operate as a SPAD and a quenching circuit configured to reduce a reverse-bias voltage applied to the SPAD when an avalanche event occurs in the SPAD. The APD 400 configured to operate as a SPAD may be coupled to an electronic quenching circuit that reduces the applied voltage V below the breakdown voltage when an avalanche-detection event occurs. Reducing the applied voltage may halt the avalanche process, and the applied reverse-bias voltage may then be re-set to await a subsequent avalanche event. Additionally, the APD 400 may be coupled to a circuit that generates an electrical output pulse or edge when an avalanche event occurs.

In some implementations, the APD 400 or the APD 400 along with transimpedance amplifier have a noise-equivalent power (NEP) that is less than or equal to 100 photons, 50 photons, 30 photons, 20 photons, or 10 photons. For example, the APD 400 may be operated as a SPAD and may have a NEP of less than or equal to 20 photons. As another example, the APD 400 may be coupled to a transimpedance amplifier that produces an output voltage signal with a NEP of less than or equal to 50 photons. The NEP of the APD 400 is a metric that quantifies the sensitivity of the APD 400 in terms of a minimum signal (or a minimum number of photons) that the APD 400 can detect. The NEP may correspond to an optical power (or to a number of photons) that results in a signal-to-noise ratio of 1, or the NEP may represent a threshold number of photons above which an optical signal may be detected. For example, if the APD 400 has a NEP of 20 photons, then the input beam 410 with 20 photons may be detected with a signal-to-noise ratio of approximately 1 (e.g., the APD 400 may receive 20 photons from the input beam 410 and generate an electrical signal representing the input beam 410 that has a signal-to-noise ratio of approximately 1). Similarly, the input beam 410 with 100 photons may be detected with a signal-to-noise ratio of approximately 5. In some implementations, the lidar system 100 with the APD 400 (or a combination of the APD 400 and transimpedance amplifier) having a NEP of less than or equal to 100 photons, 50 photons, 30 photons, 20 photons, or 10 photons offers improved detection sensitivity with respect to a conventional lidar system that uses a PN or PIN photodiode. For example, an InGaAs PIN photodiode used in a conventional lidar system may have a NEP of approximately $10^4$ to $10^5$ photons, and the noise level in a lidar system with an InGaAs PIN photodiode may be $10^3$ to $10^4$ times greater than the noise level in a lidar system 100 with the InGaAs APD detector 400.

Referring back to FIG. 1, an optical filter may be located in front of the receiver 140 and configured to transmit light at one or more operating wavelengths of the light source 110 and attenuate light at surrounding wavelengths. For example, an optical filter may be a free-space spectral filter located in front of APD 400 of FIG. 11. This spectral filter may transmit light at the operating wavelength of the light source 110 (e.g., between approximately 1530 nm and 1560 nm) and attenuate light outside that wavelength range. As a more specific example, light with wavelengths of approximately 400-1530 nm or 1560-2000 nm may be attenuated by any suitable amount, such as for example, by at least 5 dB, 10 dB, 20 dB, 30 dB, or 40 dB.

Figure 12:
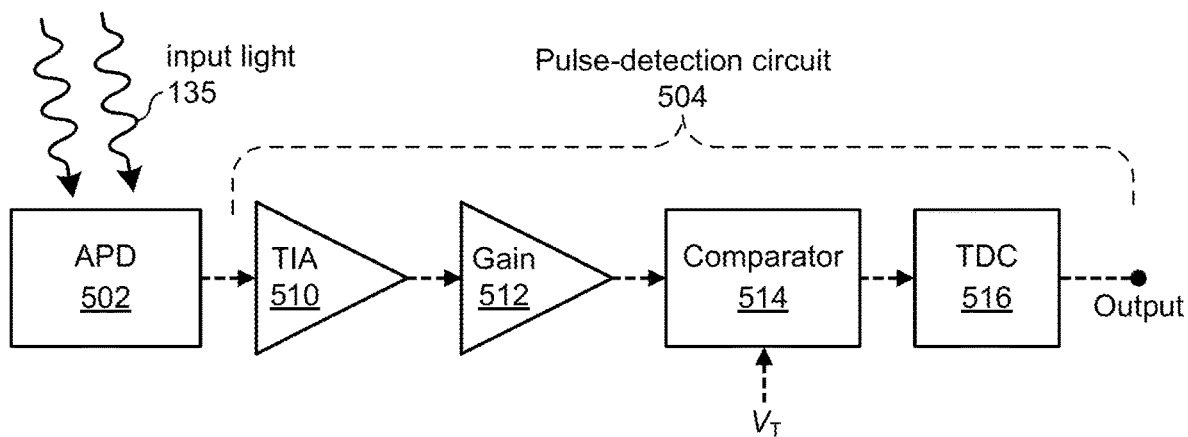
FIG. 12 illustrates an example photodiode coupled to a pulse-detection circuit, which can operate in the lidar system of FIG. 1.

Next, FIG. 12 illustrates an APD 502 coupled to an example pulse-detection circuit 504. The APD 502 can be similar to the APD 400 discussed above with reference to FIG. 11, or can be any other suitable detector. The pulse-detection circuit 504 can operate in the lidar system of FIG. 1 as part of the receiver 140. Further, the pulse-detection circuit 504 can operate in the receiver 164 of FIG. 2, the receiver 304 of FIG. 9, or any other suitable receiver. The pulse-detection circuit 504 alternatively can be implemented in the controller 150, the controller 306, or another suitable controller. In some implementations, parts of the pulse-detection circuit 504 can operate in a receiver and other parts of the pulse-detection circuit 504 can operate in a controller. For example, components 510 and 512 may be a part of the receiver 140, and components 514 and 516 may be a part of the controller 150.

The pulse-detection circuit 504 may include circuitry that receives a signal from a detector (e.g., an electrical current from the APD 502) and performs current-to-voltage conversion, signal amplification, sampling, filtering, signal conditioning, analog-to-digital conversion, time-to-digital conversion, pulse detection, threshold detection, rising-edge detection, or falling-edge detection. The pulse-detection circuit 504 may determine whether an optical pulse has been received by the APD 502 or may determine a time associated with receipt of an optical pulse by the APD 502. Additionally, the pulse-detection circuit 504 may determine a duration of a received optical pulse. In an example implementation, the pulse-detection circuit 504 includes a transimpedance amplifier (TIA) 510, a gain circuit 512, a comparator 514, and a time-to-digital converter (TDC) 516.

The TIA 510 may be configured to receive an electrical-current signal from the APD 502 and produce a voltage signal that corresponds to the received electrical-current signal. For example, in response to a received optical pulse, the APD 502 may produce a current pulse corresponding to the optical pulse. The TIA 510 may receive the current pulse from the APD 502 and produce a voltage pulse that corresponds to the received current pulse. The TIA 510 may also act as an electronic filter. For example, the TIA 510 may be configured as a low-pass filter that removes or attenuates high-frequency electrical noise by attenuating signals above a particular frequency (e.g., above 1 MHz, 10 MHz, 20 MHz, 50 MHz, 100 MHz, 200 MHz, or any other suitable frequency).

The gain circuit 512 may be configured to amplify a voltage signal. As an example, the gain circuit 512 may include one or more voltage-amplification stages that amplify a voltage signal received from the TIA 510. For example, the gain circuit 512 may receive a voltage pulse from the TIA 510, and the gain circuit 512 may amplify the voltage pulse by any suitable amount, such as for example, by a gain of approximately 3 dB, 10 dB, 20 dB, 30 dB, 40 dB, or 50 dB. Additionally, the gain circuit 512 may also act as an electronic filter configured to remove or attenuate electrical noise.

The comparator 514 may be configured to receive a voltage signal from the TIA 510 or the gain circuit 512 and produce an electrical-edge signal (e.g., a rising edge or a falling edge) when the received voltage signal rises above or falls below a particular threshold voltage $V_T$. As an example, when a received voltage rises above $V_T$, the comparator 514 may produce a rising-edge digital-voltage signal (e.g., a signal that steps from approximately 0 V to approximately 2.5 V, 3.3 V, 5 V, or any other suitable digital-high level). As another example, when a received voltage falls below $V_T$, the comparator 514 may produce a falling-edge digital-voltage signal (e.g., a signal that steps down from approximately 2.5 V, 3.3 V, 5 V, or any other suitable digital-high level to approximately 0 V). The voltage signal received by the comparator 514 may be received from the TIA 510 or the gain circuit 512 and may correspond to an electrical-current signal generated by the APD 502. For example, the voltage signal received by the comparator 514 may include a voltage pulse that corresponds to an electrical-current pulse produced by the APD 502 in response to receiving an optical pulse. The voltage signal received by the comparator 514 may be an analog signal, and an electrical-edge signal produced by the comparator 514 may be a digital signal.

The time-to-digital converter (TDC) 516 may be configured to receive an electrical-edge signal from the comparator 514 and determine an interval of time between emission of a pulse of light by the light source and receipt of the electrical-edge signal. The output of the TDC 516 may be a numerical value that corresponds to the time interval determined by the TDC 516. In some implementations, the TDC 516 has an internal counter or clock with any suitable period, such as for example, 5 ps, 10 ps, 15 ps, 20 ps, 30 ps, 50 ps, 100 ps, 0.5 ns, 1 ns, 2 ns, 5 ns, or 10 ns. The TDC 516 for example may have an internal counter or clock with a 20 ps period, and the TDC 516 may determine that an interval of time between emission and receipt of a pulse is equal to 25,000 time periods, which corresponds to a time interval of approximately 0.5 microseconds. Referring back to FIG. 1, the TDC 516 may send the numerical value "25000" to a processor or controller 150 of the lidar system 100, which may include a processor configured to determine a distance from the lidar system 100 to the target 130 based at least in part on an interval of time determined by a TDC 516. The processor may receive a numerical value (e.g., "25000") from the TDC 516 and, based on the received value, the processor may determine the distance from the lidar system 100 to a target 130.

Example Fiber Laser Implementation

Figure 13:
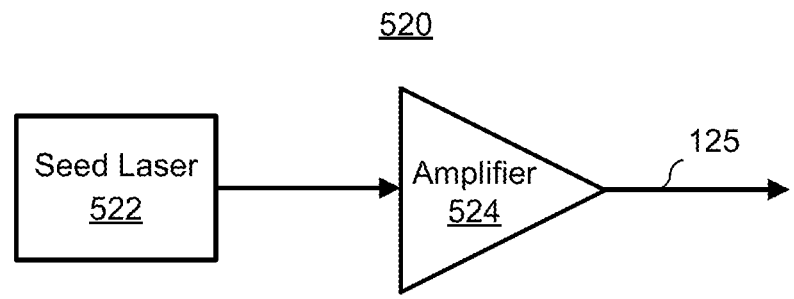
FIG. 13 illustrates an example light source that includes a seed laser and an amplifier, which can operate in the lidar system of FIG. 1.

FIG. 13 illustrates an example light source 520 that can operate as the light source 110 in the lidar system of FIG. 1 or a similar lidar system. The light source 520 includes a seed laser 522 and an amplifier 524. The light source 520 in various implementations includes one or more seed lasers 522 or one or more amplifiers 524. The seed laser 520 may include (1) a laser diode (e.g., a DFB laser) driven by a pulse generator, (2) a wavelength-tunable laser configured to produce light at multiple wavelengths, (3) multiple laser diodes configured to produce light at multiple respective wavelengths, or (4) any other suitable laser source. The seed laser 522 may produce low-power optical pulses, and one or more optical amplifiers 524 may be configured to amplify the low-power pulses to produce amplified pulses of light. The amplified pulses of light may be emitted as output beam 125. As an example, the amplifier 524 may receive optical seed pulses having an average power of greater than or equal to 1 microwatt, and the amplified output pulses from the amplifier 524 may have an average power of greater than or equal to 1 mW. As another example, the amplifier 524 may receive optical seed pulses having a pulse energy of greater than or equal to 1 pJ, and the amplified output pulses from the amplifier 524 may have a pulse energy of greater than or equal to 0.1 µJ.

The amplifier 524 may be referred to as a fiber amplifier, optical amplifier, fiber-optic amplifier, optical amp, or amp. In various implementations, all or part of an amplifier 524 may be included in light source 110. The amplifier 524 may include any suitable number of optical-amplification stages. As an example, the amplifier 524 may include one, two, three, four, or five optical-amplification stages. In one implementation, the amplifier 524 includes a single-pass amplifier in which light makes one pass through the amplifier 524. In another implementation, the amplifier 524 includes a double-pass amplifier in which light makes two passes through the amplifier gain medium. In some cases, the amplifier 524 may act as a preamplifier (e.g., an amplifier that amplifies seed pulses from a laser diode or the seed laser 522), a mid-stage amplifier (e.g., an amplifier that amplifies light from another amplifier), or a booster amplifier (e.g., an amplifier that sends a free-space output beam 125 to a scanner of the lidar system). A preamplifier may refer to the first amplifier in a series of two or more amplifiers, a booster amplifier may refer to the last amplifier in a series of amplifiers, or a mid-stage amplifier may refer to any amplifier located between a preamplifier and a booster amplifier.

The amplifier 524 may provide any suitable amount of optical power gain, such as for example, a gain of approximately 5 dB, 10 dB, 20 dB, 30 dB, 40 dB, 50 dB, 60 dB, or 70 dB. As an example, the amplifier 524 (which may include two or more separate amplification stages) may receive pulses with a 1-µW average power and produce amplified pulses with a 5-W average power, corresponding to an optical power gain of approximately 67 dB. As another example, the amplifier 524 may include two or more amplification stages each having a gain of greater than or equal to 20 dB, corresponding to an overall gain of greater than or equal to 40 dB. As another example, the amplifier 524 may include three amplification stages (e.g., a preamplifier, a mid-stage amplifier, and a booster amplifier) having gains of approximately 30 dB, 20 dB, and 10 dB, respectively, corresponding to an overall gain of approximately 60 dB.

In the light source 520, an optical fiber may convey optical pulses amplified by amplifier 524 to an output collimator that produces a free-space optical beam 125. The optical fiber may convey, carry, transport, or transmit light from one optical component to another, may be referred to as a fiber-optic cable, a fiber, an optical link, a fiber-optic link, or a fiber link. An optical fiber may include single-mode (SM) fiber, large-mode-area (LMA) fiber, multi-mode (MM) fiber, polarization-maintaining (PM) fiber, photonic-crystal or photonic-bandgap fiber, gain fiber (e.g., rare-earth-doped optical fiber for use in an optical amplifier), multi-clad fiber (e.g., a double-clad fiber having a core, inner cladding, and outer cladding), or any other suitable optical fiber, or any suitable combination thereof. As an example, an optical fiber may include a glass SM fiber with a core diameter of approximately 8 µm and a cladding diameter of approximately 125 µm. As another example, an optical fiber may include a photonic-crystal fiber or a photonic-bandgap fiber in which light is confined or guided by an arrangement of holes distributed along the length of a glass fiber. In particular embodiments, one end of an optical fiber may be coupled to, attached to, or terminated at an output collimator. An output collimator may include a lens, a GRIN lens, or a fiber-optic collimator that receives light from a fiber-optic cable and produces the free-space optical beam 125.

Figure 14:
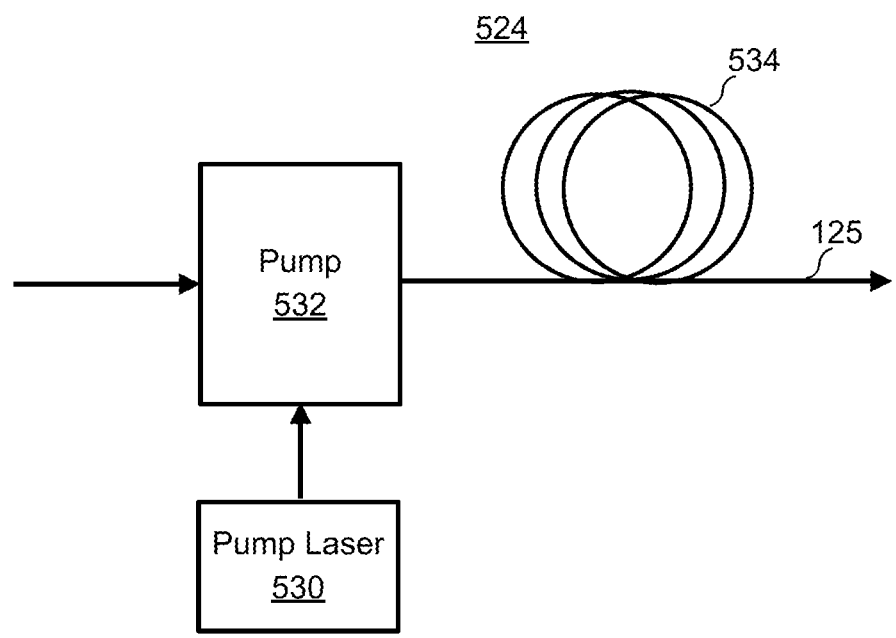
FIG. 14 illustrates an example implementation of the amplifier of FIG. 13.

The amplifier 524 can be implemented as illustrated in FIG. 14. The amplifier 524 in this example implementation includes a pump laser 530, a pump 532, and a gain fiber 534. In operation, the pump laser 530 pumps, or provides with energy, the gain fiber 534.

The optically pumped gain fiber 534 provides optical gain to particular wavelengths of light traveling through the gain fiber 534. The pump light and the light to be amplified may both propagate substantially through the core of the gain fiber 534. The gain fiber 534 (which may be referred to as optical gain fiber) may be an optical fiber doped with rare-earth ions, such as for example erbium ($Er^{3+}$), neodymium ($Nd^{3+}$), ytterbium ($Yb^{3+}$), praseodymium ($Pr^{3+}$), holmium ($Ho^{3+}$), thulium ($Tm^{3+}$), or any other suitable rare-earth element, or any suitable combination thereof. The rare-earth dopants (which may be referred to as gain material) absorb light from the pump laser 530 and are "pumped" or promoted into excited states that provide amplification to particular wavelengths of light through stimulated emission. The rare-earth ions in excited states may also emit photons through spontaneous emission, resulting in the production of amplified spontaneous emission (ASE) light by the amplifier 524. In an example implementation, the amplifier 524 with erbium-doped gain fiber 534 may be referred to as an erbium-doped fiber amplifier (EDFA) and may be used to amplify light having wavelengths between approximately 1520 nm and approximately 1600 nm. The gain fiber 534 in some implementations is doped with a combination of erbium and ytterbium dopants and may be referred to as a Er:Yb co-doped fiber, Er:Yb:glass fiber, Er:Yb fiber, Er:Yb-doped fiber, erbium/ytterbium-doped fiber, or Er/Yb gain fiber. The amplifier 524 with Er:Yb co-doped gain fiber may be referred to as an erbium/ytterbium-doped fiber amplifier (EYDFA). An EYDFA may be used to amplify light having wavelengths between approximately 1520 nm and approximately 1620 nm. The gain fiber 534 doped with ytterbium may be part of a ytterbium-doped fiber amplifier (YDFA). A YDFA may be used to amplify light having wavelengths between approximately 1000 nm and approximately 1130 nm. The gain fiber 534 doped with thulium may be part of a thulium-doped fiber amplifier (TDFA). A TDFA may be used to amplify light having wavelengths between approximately 1900 nm and approximately 2100 nm.

Adjusting Scan Parameters Based on Ground Detection

Figure 15:
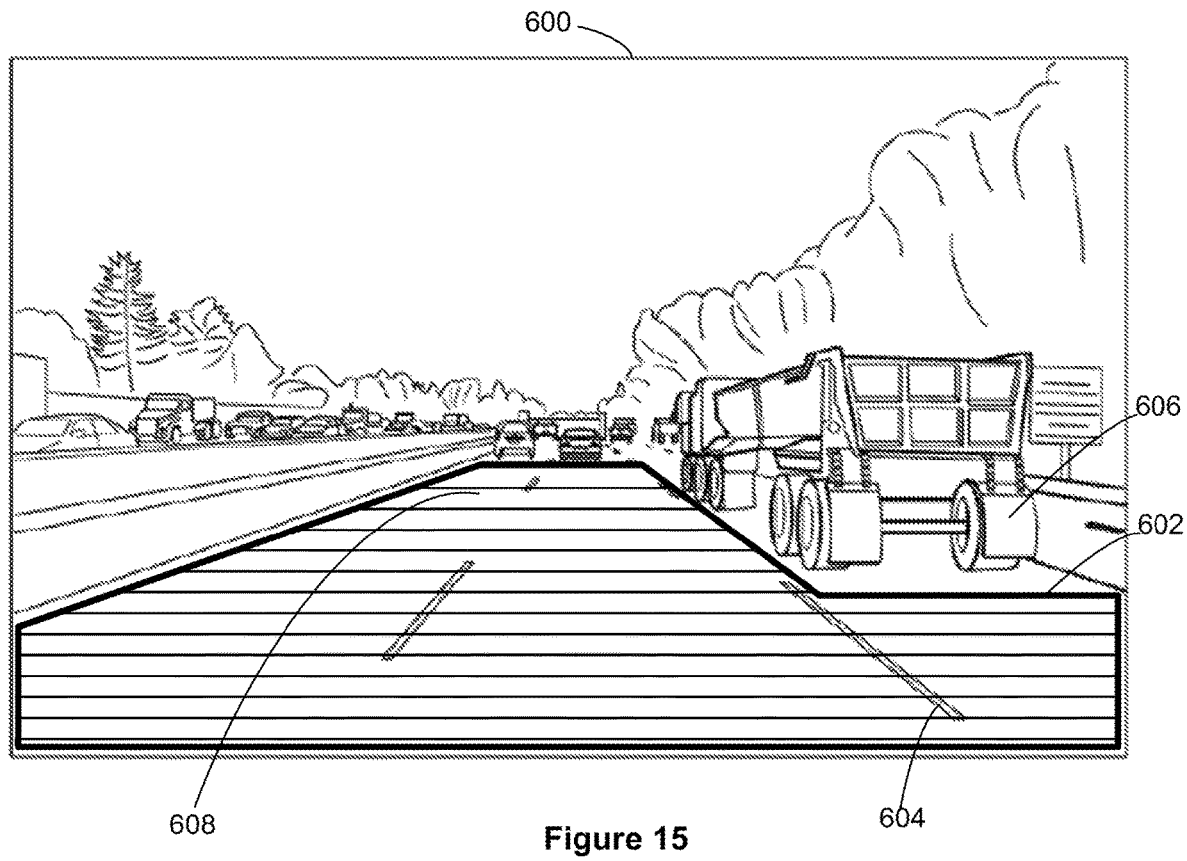
FIG. 15 illustrates an example scene within a field of regard of the lidar system of FIG. 1 operating in a vehicle, where the field of regard overlaps a region of ground ahead of the vehicle.

FIG. 15 illustrates an example scene within a field of regard 600 of a lidar system operating in a certain vehicle. The field of regard 600 has a certain horizontal angular span and a certain vertical angular span. The field of regard 600 overlaps a region of ground ahead of the vehicle. The corresponding portion of the field of regard, which may be referred to as the "ground portion," is schematically illustrated as being enclosed by a polygon 602. The scene includes a road with road markings 604, a vehicle 606 traveling on the road approximately ten meters ahead and in the next lane to the right of the vehicle, a relatively distant region 608 covered by the ground portion of the field of regard, illuminated by the lidar system at a relatively low grazing angle, other vehicles, other objects such as trees (including those beyond the maximum range of the lidar system, etc.). Because of the vehicle 606, the ground portion 602 of the field of regard has a longer vertical angular span on the left side and in the middle of the field of regard 600, as illustrated in FIG. 15.

The term "ground" herein can refer to the road on which the vehicle is travelling, particularly the portion of road directly ahead of the vehicle, but also the road located to the sides and rear of the vehicle as well as any median, sidewalk, shoulder, crosswalk, or bike path located on or near the road. This can include the lane in which the vehicle is located as well as any adjacent lanes and the shoulder of the road. Further, when the vehicle is travelling through a tunnel, the walls and even the ceiling may have markings similar to the road markings. The lidar system may treat the walls of a tunnel and, in some implementations or scenarios, the ceiling of the tunnel as ground portions of the field of regard. Accordingly, in one example scenario, the ground portion has a relatively long vertical angular span on the left side of the as well as on the right side of the field of regard, to include the walls (at least up to a certain elevation, which may be dynamically determined or fixed at 2 m, 2.5 m, 3 m, or any other suitable value), and a shorter vertical angular span in the middle of the field of regard.

Figure 16:
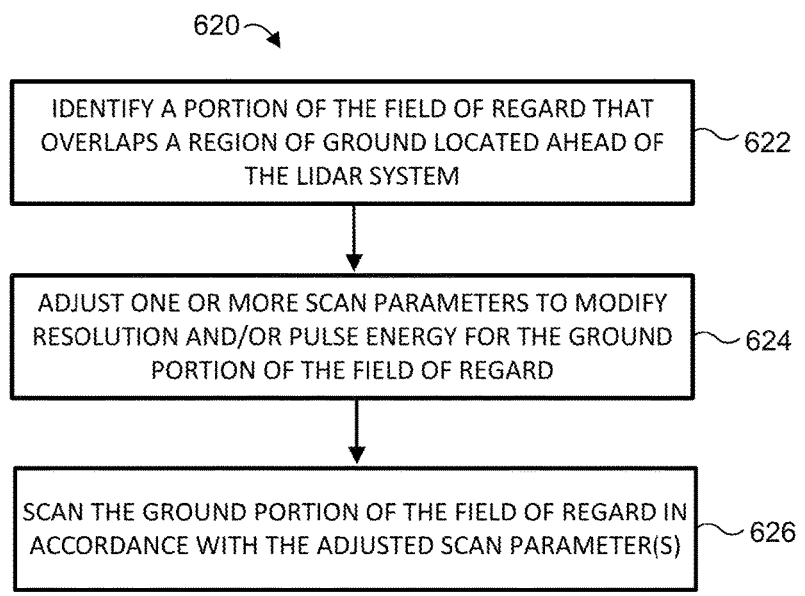
FIG. 16 is a flow diagram of an example method for adjusting one or more scan parameters to increase resolution and/or modify pulse power when scanning the ground ahead of the vehicle.

FIG. 16 is a flow diagram of an example method 620 for adjusting one or more scan parameters when the field of regard includes a ground portion, which can be implemented in a lidar system. For example, the method 620 can be implemented in the controller 150 (FIG. 1), the controller 306 (FIG. 9), the vehicle controller 372 (FIG. 10), etc. In any case, the method 620 can be implemented as a set of instructions stored on a non-transitory computer-readable medium and executable by one or more processors. For convenience, the discussion below refers primarily to the lidar system in connection with such steps as detecting the distance to points on the ground, selecting the pulse power, selecting the scan rate, etc., but it will be understood that in some implementations these decisions are implemented in a controller of an autonomous vehicle responsible for other automated decisions related to maneuvering and otherwise controlling the vehicle (e.g., the vehicle controller 372 of FIG. 10).

The method 620 begins at block 622, where the ground portion of the field of regard is identified. To this end, the lidar system can use the data collected during the previous scan or several prior scans of the field of regard. In some cases, the lidar system can generate a point cloud and the controller of the lidar system, and/or a controller of the autonomous vehicle in which the lidar system operates, can identify the ground portion of the field of regard using a classifier. In other cases, the lidar system can analyze the shapes of return pulses and determine that pixels produced within a portion of the field of regard likely correspond to locations on the surface of the road or otherwise on the ground.

As another alternative, the lidar system can determine the cumulative amount of energy in a set of pulses directed toward a certain region of interest by multiplying the amount of energy associated with an individual pulse (which may be stored in the memory as part of configuration data, for example) by the number of pulses in the set. The lidar system then can determine the cumulative amount of energy of the returns corresponding to these pulses, while eliminating the statistical outliers in some cases as discussed below, and determine how much of the emitted light the region scatters. The lidar system in this manner can obtain a metric of approximate reflectivity for the region and determine whether the region is likely a ground region based on this metric. The lidar system in some cases can eliminate statistical outliers such as ranging events that produce no return pulse as well as ranging events that produce high-energy returns, when such ranging events occur individually or in small sets within larger sets of ranging events that produce low-energy returns. For example, a lidar system can consider a relatively large set of pulses defining a contiguous region of interest within the field of regard (e.g., 30% of the total number of pixels in a single scan frame that covers the entire field of regard), determine that the contiguous region of interest produces a low amount of scattered light and thus has low average reflectivity, and eliminate as outliers individual returns or small sets of high-energy returns that may correspond to puddles of water on the road, for example. Similarly, the lidar system can eliminate outliers that correspond to absent returns for the corresponding ranging events, so as to distinguish between returns that correspond to low amounts of scattered light on the one hand, and absent returns that may correspond to pulses traveling toward objects disposed beyond the maximum range of the lidar system on the other hand.

In addition to determining what part of the field or regard overlaps with the ground, the lidar system can determine distances to points on the ground along the path of the IFOV, and apply these distances when adjusting the one or more scan parameters. The lidar system can determine, for example, that the lowest scan line in the field of regard corresponds to points on the ground 20 meters away, and adjust the pulse repetition frequency for this portion of the field of regard by assuming that the maximum range of the lidar system for this portion is 20 meters.

Further, the lidar system can use data from other sensors to identify the ground portion of the field of regard. The controller of the lidar system can receive data from an external camera, for example (e.g., a camera included in the sensors 158 in FIG. 1), or a vehicle controller (e.g., the vehicle controller 372 of FIG. 10) can provide indications of where the ground is relative to the controller of the lidar system.

Still further, the vehicle equipped with additional sensors such as the sensors and remote system interfaces 391 of FIG. 10 can use positioning data along with topographical data received from a remote GIS system or stored locally to determine distances to points on the ground.

Figure 17:
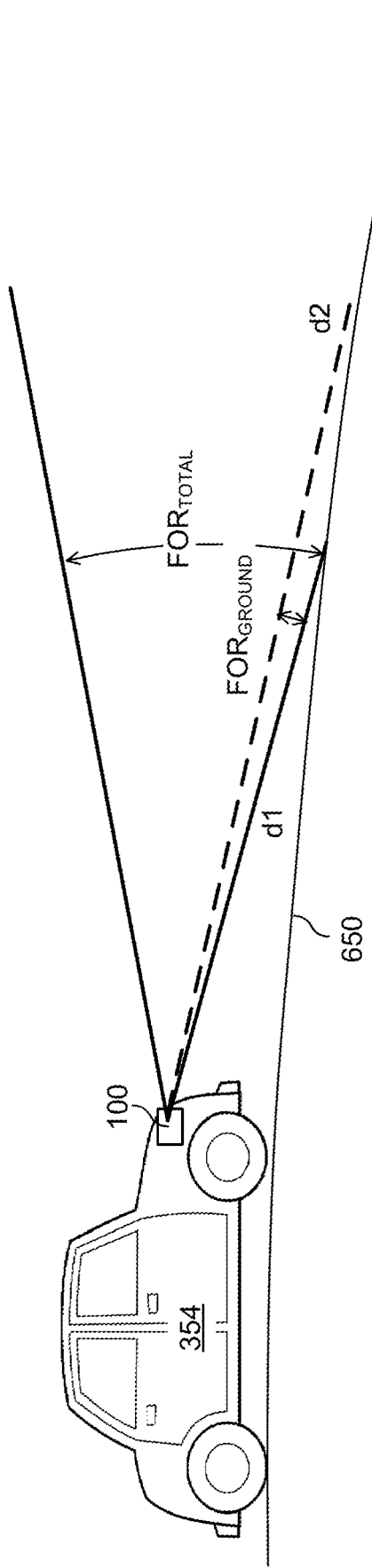
FIG. 17 illustrates detection of the ground portion of the field of regard when the vehicle in which the lidar system operates is travelling on a road with a downward slope.
Figure 18:
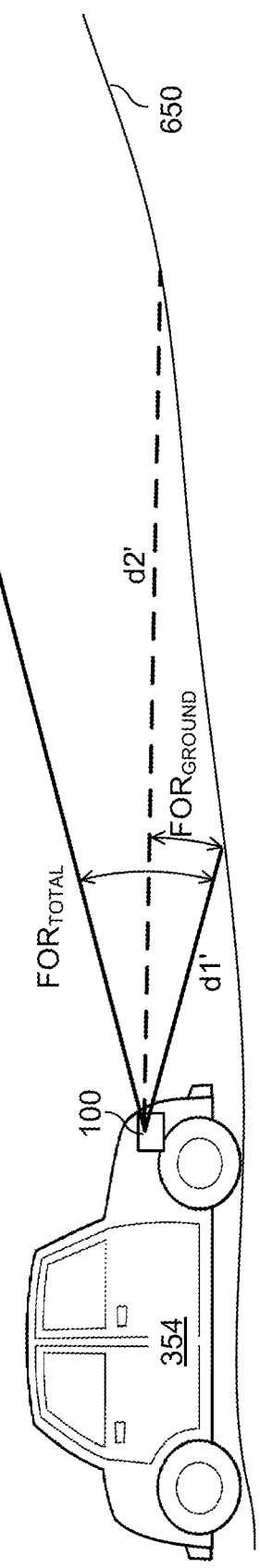
FIG. 18 illustrates detection of the ground portion in the field of regard when the vehicle in which the lidar system operates is travelling on a road with an upward slope.

Referring for clarity to FIG. 17, the vehicle 354 of FIG. 10 can travel along a downward slope 650, and the ground portion of the field of regard can take up a relatively small percentage of the total field of regard, along the vertical dimension. On the other hand, when the vehicle 354 travels along an upward slope 660, the ground portion of the field of regard can take up a relatively large percentage of the total field of regard along the vertical dimension, as illustrated in FIG. 18. For the vehicle 354 traveling along the downward slope 650, distances to the closest and farthest points on the ground within the field of regard are d1 and d2, and for the vehicle 354 traveling along the upward slope 650, distances to the closest and farthest points on the ground within the field of regard are d1' and d2'. As schematically illustrated in FIGS. 17 and 18, the distances can vary depending on road topography. Moreover, lidar systems in different vehicles can be mounted at different heights relative to the ground level, which can further affect the distances to the points on the ground.

Depending on the implementation, the lidar system can identify the ground portion of the field of regard in terms of a single delimiter, such as the vertical angle at which the "horizon" occurs within the field of regard, i.e., where the ground ends and an area above ground begins in the absence of obstacles. If desired, however, a lidar system can be configured to recognize more complex boundaries of the ground portion, such as the polygon 602 of FIG. 15. In this case, however, the lidar system may need to recognize the boundary of the ground portion along both the vertical dimension and the horizontal dimension. Accordingly, the lidar system can vary scan parameters in view of both vertical and horizontal positions within the scan.

Referring again to FIG. 16, the flow next proceeds to block 624, where one or several scan parameters are adjusted for scanning the ground portion of the field of regard. As indicated above, the lidar system can adjust such scan parameters as scanning rate (which can measured in radians per second, degrees per second, etc.), line density, pulse energy, pulse repetition frequency, etc. depending on whether the ground portion 602 of the field of regard 600 or another portion of the field of regard 600 is being scanned. These adjustments result in a modified scan pattern, a modified pulse energy distribution across the field of regard, or both. The lidar system thus can vary the scan parameters related to the light source, the scanner, or both. In various implementations or scenarios, the lidar system can increase the density of scan lines, increase the horizontal resolution (e.g., by decreasing the scanning rate and/or increasing the pulse repetition frequency, emitting new pulses in response detecting returns rather than at predefined fixed time intervals), increase both the density of scan lines and the horizontal resolution. As discussed herein, the lidar system can modify the scanning rate and the line density by controlling how quickly one or several mirrors of the scanner pivot, rotate, or otherwise move.

In some implementations, the light source is a direct-emitter laser diode that directly produces the emitted optical pulses that are scanned across the field of regard (e.g., the optical pulses from the laser diode are not amplified by an optical amplifier). In general, when the light source includes a direct-emitter laser diode, the lidar system can vary the pulse energy and pulse repetition frequency independently of each other, as long as the maximum power handling capability of the laser diode is not exceeded (e.g., to ensure the laser diode does not experience a thermal failure or optical damage to the output facets).

Alternatively, the light source may be implemented as the light source 520 of FIG. 13 and include a pulsed laser diode followed by one or more optical-amplification. The lidar system in this case varies the pulse energy approximately inversely with the pulse repetition frequency. Thus, as the pulse repetition frequency is increased, the pulse energy decreases. As a more specific example, the lidar system can double the pulse repetition frequency and accordingly decrease the pulse energy approximately by a factor of two. If higher pulse energies are desired, the lidar system may need to operate the fiber laser at a reduced pulse repetition frequency.

In one implementation, the lidar system addresses this limitation by dynamically varying the pump laser power (i.e., vary the power of the pump laser diode(s) that provide optical pumping to the optical gain fiber in the fiber amplifier). Referring to FIG. 14, for example, the lidar system can vary the power of the pump laser 530. Thus, to obtain higher pulse energy without reducing the pulse repetition frequency, the lidar system can increase the pump laser power supplied to the gain fiber 534. Similarly, to increase the pulse repetition frequency without reducing the pulse energy, the lidar system can increase the pump laser power supplied to the gain fiber 534, while also increasing the pulse repetition frequency of the seed laser diode 522 of FIG. 13.

Because the lidar system can determine the distance from the lidar system to the ground along the IFOV of the emitted light pulse, the lidar system can also adjust the output power to account for the fact that a light pulse that is expected to hit the ground after traveling 20 meters does not require the same energy as a light pulse that is expected to hit an object 200 meters away, to consider one example. The lidar system thus can reduce the output energy of a light pulse when the lidar system expects the light pulse to hit the ground at a distance of less than the maximum range of the lidar system, or the maximum distance at which the lidar system is configured to detect targets.

In some cases, however, the lidar system can increase the laser power and the output energy of a light pulse when the lidar system determines with a high degree of confidence that a transmitted light pulse should hit the ground, but the default light pulse energy is insufficient to allow the lidar sensor to detect a return. For example, when a light pulse strikes the road at a sufficiently low grazing angle, the light pulse is reflected by the road and very little light is scattered and returned to the lidar sensor, making the road difficult to detect. A relatively high optical absorption of the ground can be an alternative or additional reason for the low amount of scattered light to travel back to the lidar system when the ground portion of the field of regard is scanned. For example, the road can be made from a dark material that tends to absorb incident light so that a relatively small fraction (e.g., <30%) of the light pulse is scattered. Increasing the energy of a light pulse increases the likelihood that some of the scattered light will be detected by the receiver of the lidar system. The energy of the light pulse in this scenario in some cases may be higher than the energy required to detect objects at the default maximum range of the lidar system. In some implementations, the lidar system is configured to estimate an angle at which the outbound pulse will be incident on the ground, and increase the pulse energy when the angle is below a certain threshold value.

To vary the scan parameters related to the scanner, such as the scanner illustrated in FIG. 2 or FIG. 3, the lidar system can modify the speed at which one or several mirrors pivot. For example, to decrease the scanning rate along the horizontal dimension to thereby increase the horizontal resolution, a lidar system that implements the scanner 162 of FIG. 2 can decrease the speed at which the mirror 180-1 (responsible for scanning pulses of light along the horizontal dimension) pivots about the corresponding axis. More particularly, depending on the implementation, a controller can provide a corresponding signal to a galvanometer scanner or a motor, for example. To increase the density of scan lines, on the other hand, the controller can decrease the speed at which the mirror 180-2 (responsible for scanning pulses of light along the vertical dimension) pivots about the corresponding axis.

When a lidar system implements a scanner with the polygon mirror 202 of FIG. 3, the controller of the lidar system can decrease the speed at which the polygon mirror 202 rotates in order to increase the horizontal resolution. The controller can decrease the speed at which the scan mirrors 212A and 212B rotate about the respective axis to increase the line density.

Figure 19:
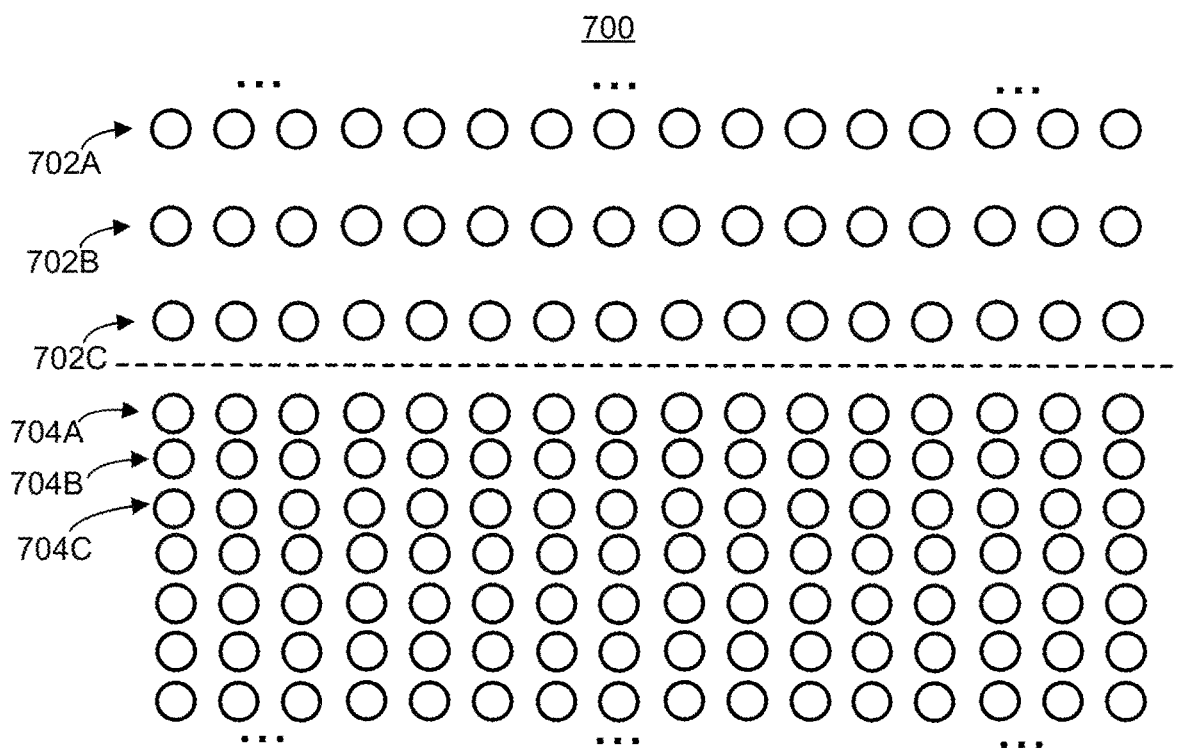
FIG. 19 illustrates an example scan pattern with an increased line density in the ground portion in the field of regard.
Figure 20:
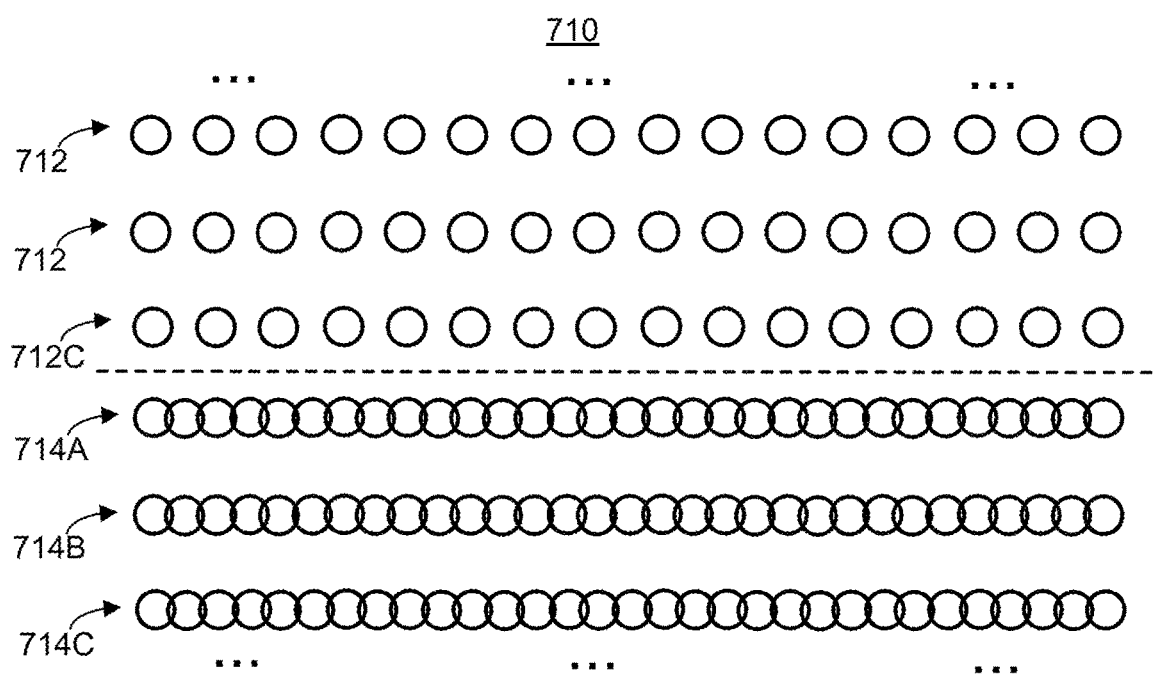
FIG. 20 illustrates an example scan pattern with an increased horizontal resolution in the ground portion of the field of regard.

In some implementations, a lidar system can scan the field of regard according to one density of scan lines (corresponding to pixel density along the vertical dimension) in the ground portion of the field of regard, and according to another density of scan lines in the remaining portion of the field of regard. As illustrated in FIG. 19, for example, a scan 700 can include scan lines 702A, 702B, 702C, etc., separated by a certain angular offset, in the portion of the field of regard that does not overlap the ground, and scan lines 704A, 704B, 704C, etc., separated by a smaller angular offset, in the ground portion of the field of regard. A lidar system similarly can use two values for the horizontal resolution. FIG. 20 illustrates a scan 710 that includes scan lines 712A, 712B, 712C, etc., with a certain horizontal resolution, in the portion of the field of regard that does not overlap the ground, and scan lines 714A, 714B, 714C, etc., with a different horizontal resolution, in the ground portion of the field of regard. More particularly, the density of pixels along the horizontal direction in scan lines 712 in this example scenario is higher than the density of pixels along the horizontal direction in scan lines 714.

Figure 21:
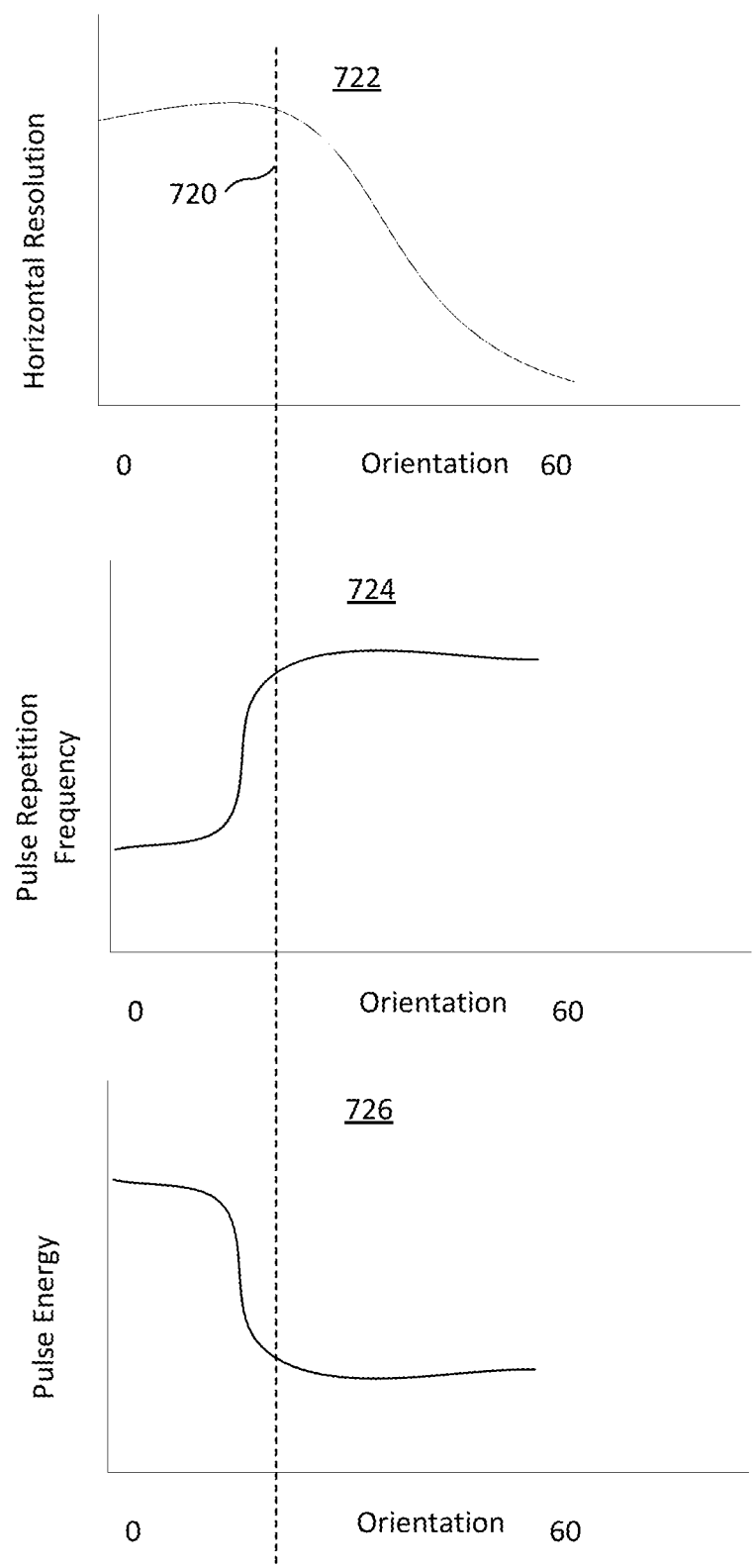
FIG. 21 illustrates another example selection of one or more scan parameters for scanning the ground portion of the field of regard.

FIG. 21 illustrates how the lidar system can vary scan parameters such as density of scan lines, horizontal resolution, pulse repetition frequency, pulse energy, etc. using more than two respective values for the ground portion of the field of regard and the remaining region, unlike the scans 700 and 710 of FIGS. 19 and 20. When conducting a scan of a field of regarding including a ground portion delimited by vertical angle 720, a lidar system can vary the horizontal resolution according to graph 722, vary the pulse repetition frequency according to graph 724, and vary pulse energy according to graph 726. The graphs can 722, 724, and 726 can correspond to pre-configured values or dynamic values the lidar system or the vehicle controller sets in view of previous scans, for example. The controller of the lidar system for example can implement a dynamic algorithm or machine learning to select the suitable scan parameters for the ground portion, or combinations of suitable scan parameters (e.g., horizontal resolution in combination with as average laser power over time). As another example, the lidar system can determine the expected distance from the lidar system to a point on the ground along the path of the IFOV of the light source, and select a certain horizontal resolution in view of the expected distance.

Thus, a lidar system in some cases combines some of the adjustments of scan parameters discussed above. For example, the lidar system may use selections or combinations of the increased pulse repetition frequency with decreased laser power, increased laser power for low-grazing angle cases with decreased, default, or increased pulse repetition frequency, and default laser power for situations in which the ground or road is not expected to be in the IFOV of the light source. The lidar system may dynamically modify the laser power and pulse repetition frequency characteristics based on ground expectations to ensure that the average power of the laser during some time period is within the capability of the laser of the lidar sensor.

Additionally, the lidar system may keep the average power of the laser at or below a particular threshold power to ensure that the lidar system complies with eye-safety requirements. For example, when scanning across a field of regard, the lidar system may increase pulse energy when scanning the ground at a grazing angle, and decrease pulse energy when scanning portions of the field of regard that include objects located relatively close to the lidar system (e.g., <30 meters) or objects that produce a relatively high amount of scattered light. Although the lidar system may vary the pulse energy while scanning across the field of regard, the overall average optical power emitted by the lidar system during the scan may remain below a threshold average optical power to ensure that the lidar system operates in an eye-safe manner. As another example, the lidar system may vary the pulse repetition frequency when scanning across a field of regard (e.g., use higher pulse repetition frequency when scanning regions where higher resolution is desired; and scan other regions with lower pulse repetition frequency) so that, overall, the average optical power for a scan across the field of regard remains below a particular threshold power.

In some implementations, the lidar system may adjust the pulse repetition frequency and/or the pulse energy based on the amount of scattered light produced by objects in the field of regard. For example, the lidar system may increase the pulse energy when scanning a region of the field of regard with an object that produces a relatively small amount of scattered light, and decrease the pulse energy when scanning an object that produces a relatively large amount of scattered light. Referring back to FIG. 15, for example, the region 608 can be expected to produce little scattered light due to the distance, the grazing angle, and in some cases the type of road surface, whereas the vehicle 606 may have retroreflectors or simply a highly reflective surface that produces a large amount of scattered light, and the road markings 604 may produce a large amount of scattered light because of the paint used to make the markings. In general, objects that produce small amounts of scattered light (aka low-scatter objects) may include objects beyond a particular distance (e.g., >150 meters), dark or absorbing objects (e.g., a black tire or the dark surface of a road), or objects that have a relatively high specular reflection (e.g., a mirror). Objects that produce large amounts of scattered light (aka high-scatter objects) may include nearby objects (e.g., objects within <20 meters) or bright objects that produce diffuse scattered light (e.g., a white shirt or a white road marking).

Referring again to FIG. 16, after adjusting one or more scan parameters at block 624, the flow of the method 620 proceeds to block 626. The lidar system scans the ground portion of the field of regard in accordance with the adjusted scan parameters. As a result, the scan of the field of regard can produce a high-resolution scan of a portion of the field of regard, and/or a more accurate scan due to the improved allocation of laser power.

Figure 22:
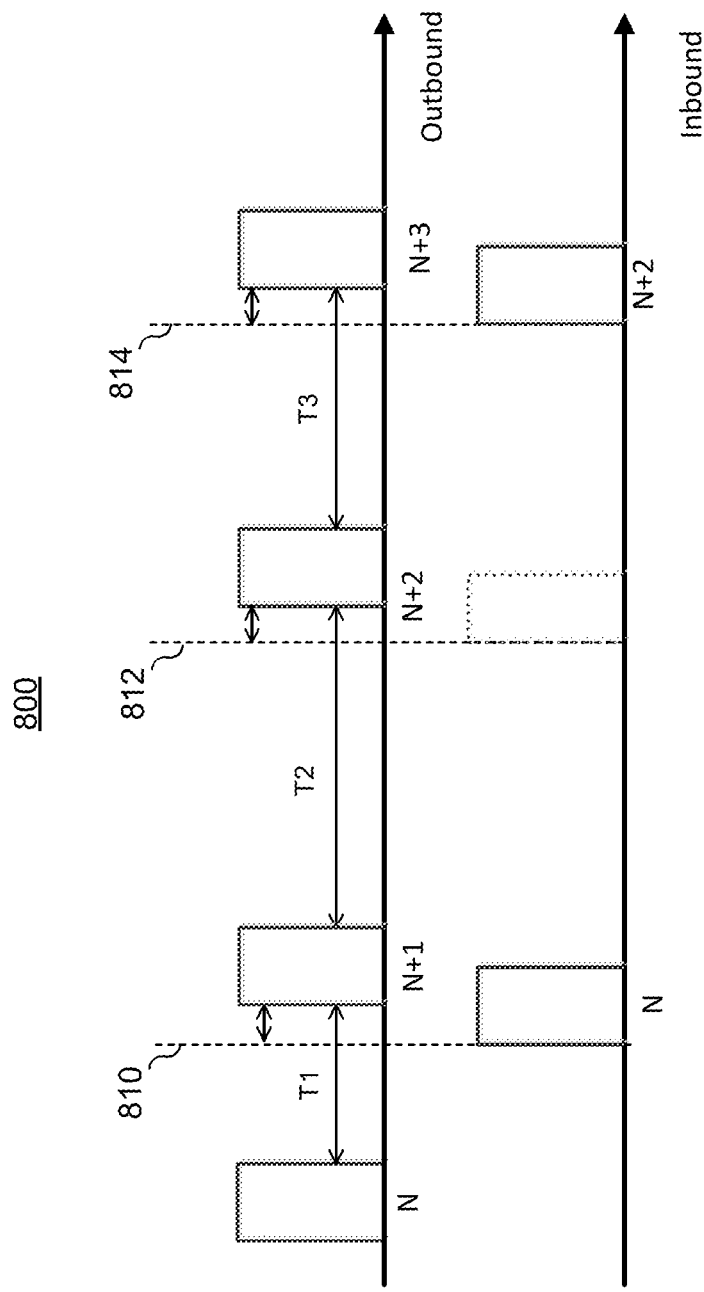
FIG. 22 is a timing diagram of an example technique for transmitting light pulses upon detection of return pulses, which can be implemented in the lidar system of this disclosure.

For further clarity, FIG. 22 illustrates example timing of outbound pulses the lidar system 100, when the lidar system 100 transmits the next outbound pulse upon detecting a return rather than upon expiration of a time period of a certain fixed predetermined duration. The pulse timing diagram 800 schematically illustrates when the controller 150 provides signals to the light source 110 to trigger emission of light pulses. As shown in the pulse timing diagram 800, the period between light pulses varies based on when the receiver 140 detects a return pulse corresponding to the previous light pulse.

In the illustrated example, after the lidar system 100 emits pulse N, the receiver 140 detects a return pulse corresponding to pulse N after a time interval T1. The controller 150 generates a signal 810 in response to the determination that the receiver 140 has received pulse N. The signal 810 causes the lidar system 100 to emit pulse N+1. For clarity, FIG. 22 also illustrates a short delay between the time pulse N returns and pulse N+1 leaves the lidar system 100. This delay corresponds to the time it takes the signal 810 to propagate through the lidar system 100.

The lidar system 100 in the scenario of FIG. 22 emits pulse N+1 but does not receive a return pulse corresponding to pulse N+1 in the time T2 it takes a light pulse to travel to a target disposed at the maximum range and return to the lidar system 100. The lidar system 100 in this case generates signal 612 and emits next pulse N+2 upon expiration of a time period of duration T2. As FIG. 22 further illustrates, the receiver 140 receives a return pulse corresponding to the emitted pulse N+2 after a time period T3. Because T1<T2 and T3<T2 in this case, the lidar system achieves a higher pulse rate than a fixed pulse rate in which each pair of adjacent pulses is separated by a time interval of duration T2.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A lidar system comprising:
   a light source configured to emit pulses of light;
   a scanner configured to scan at least a portion of the emitted pulses of light along a scan pattern contained within a field of regard of the lidar system, wherein the field of regard includes a ground portion that overlaps a region of ground located ahead of the lidar system;
   a receiver configured to detect at least a portion of the scanned pulses of light scattered by one or more remote targets; and
   a processor configured to:
      identify the ground portion of the field of regard,
      determine one or more of: (i) an estimate of an absorption or reflectivity of a surface of the ground located ahead of the lidar system, (ii) an estimate of an angle at which one or more of the emitted pulses of light will be incident on the surface of the ground located ahead of the lidar system, and (iii) an expected distance from the lidar system to the ground portion along a path of an instantaneous field of view of the light source, and
      when the emitted pulses scan the ground portion of the field of regard during a subsequent scan of the field of regard, adjust a pulse energy for the ground portion of the field of regard so that the pulse energy for the ground portion is modified relative to another portion of the field of regard and wherein the pulse energy for the ground portion is adjusted further in view of one or more of: (i) the estimate of the absorption or reflectivity of the surface of the ground located ahead of the lidar system, (ii) the estimate of the angle of incidence of the one or more emitted pulses of light, and (iii) the expected distance from the lidar system to the ground portion.

2. The lidar system of claim 1, wherein the processor is further configured to increase the pulse energy for the ground portion of the field of regard when the estimate of the angle of incidence of the one or more emitted pulses of light is below a certain threshold value corresponding to a low-grazing angle.

3. The lidar system of claim 1, wherein:
   the scan pattern comprises scan lines having a particular density, and
   the processor is further configured to increase the density of scan lines when scanning the ground portion of the field of regard to perform a higher-resolution scan of the ground portion of the field of regard.

4. The lidar system of claim 3, wherein the scanner includes:
   a first mirror configured to pivot or rotate about a first axis to scan the emitted pulses of light along a horizontal dimension, and
   a second mirror configured to pivot around a second axis orthogonal to the first axis to scan the emitted pulses of light along a vertical dimension,
   wherein to increase the density of scan lines when scanning the ground portion of the field of regard, the controller is configured to modify a speed at which the second mirror pivots about the second axis.

5. The lidar system of claim 1, wherein:
   the scan pattern has a particular horizontal resolution, and
   the processor is further configured to increase the horizontal resolution by increasing a density of pixels along the horizontal direction for the ground portion of the field of regard.

6. The lidar system of claim 5, wherein:
   the scan pattern comprises a particular scanning rate, and
   to increase the horizontal resolution for the ground portion of the field of regard, the processor is configured to decrease the scanning rate when scanning the ground portion of the field of regard.

7. The lidar system of claim 5, wherein:
   the light source emits the pulses of light at a particular pulse repetition frequency; and
   to increase the horizontal resolution for the ground portion of the field of regard, the processor is configured to increase the pulse repetition frequency when scanning the ground portion of the field of regard.

8. The lidar system of claim 1, wherein the processor is configured to identify the ground portion of the field of regard based at least in part on a vertical angle at which a horizon occurs within the field of regard, wherein the ground portion is located below the vertical angle of the horizon.

9. The lidar system of claim 1, wherein the processor is further configured to:
   decrease the pulse energy of the emitted pulses of light when the emitted pulses of light scan the ground portion of the field of regard; and
   increase the pulse energy when the emitted pulses of light scan the other portion of the field of regard, so that an average power of the emitted pulses of light for the subsequent scan of the field of regard is less than or equal to a particular threshold average power.

10. The lidar system of claim 1, wherein:
    the processor is further configured to:
       determine, based on a previous scan of the field of regard, a low-scatter portion of the field of regard that produces a relatively low amount of scattered light and a high-scatter portion of the field of regard that produces a relatively high amount of scattered light, and perform at least one of:
increase the pulse energy when the emitted pulses of light scan the low-scatter portion of the field of regard, and
decrease the pulse energy when the emitted pulses of light scan the high-scatter portion of the field of regard.

11. The lidar system of claim 1, wherein the light source comprises:
a pulsed laser diode configured to produce optical seed pulses; and
one or more optical amplifiers configured to amplify the optical seed pulses to produce the emitted pulses of light.

12. The lidar system of claim 11, wherein:
each of the one or more optical amplifiers comprises an optical gain fiber and one or more pump laser diodes that provides an amount of optical pump power to the gain fiber; and
the processor is further configured to increase the pulse energy when the emitted pulses of light scan the ground portion of the field of regard, including increase the amount of optical pump power provided to the gain fiber.

13. The lidar system of claim 1, wherein:
the light source comprises a direct-emitter laser diode configured to produce the emitted pulses of light; and
the processor is further configured to vary the pulse energy from the direct-emitter laser diode independently of a pulse repetition frequency of the direct-emitter laser diode.

14. A method in a lidar system for scanning a field of regard of the lidar system, the method comprising:
identifying, within the field of regard, a ground portion that overlaps a region of ground located ahead of the lidar system;
causing a light source to emit pulses of light;
determining one or more of: (i) an estimate of an absorption or reflectivity of a surface of the ground located ahead of the lidar system, (ii) an estimate of an angle at which one or more of the emitted pulses of light will be incident on the surface of the ground located ahead of the lidar system, and (iii) an expected distance from the lidar system to the ground portion along a path of an instantaneous field of view of the light source; and
scanning at least a portion of the emitted pulses of light along a scan pattern contained within the field of regard, including adjusting a pulse energy for the ground portion of the field of regard so that the pulse energy for the ground portion is modified relative to another portion of the field of regard;
adjusting the pulse energy for the ground portion further in view of one or more of: (i) the estimate of the absorption or reflectivity of the surface of the ground located ahead of the lidar system, (ii) the estimate of the angle of incidence of the one or more emitted pulses of light, and (iii) the expected distance from the lidar system to the ground portion; and
detecting at least a portion of the scanned pulses of light scattered by one or more remote targets.

15. The method of claim 14, wherein identifying the ground portion of the field of regard includes determining one or more locations on the ground based on data from a camera or based on data from the lidar system of a previous scan of the field of regard.

16. The method of claim 14, wherein:
the scan pattern comprises scan lines having a particular density, and
wherein the method further comprises increasing the density of scan lines when scanning the ground portion of the field of regard to perform a high-resolution scan of the ground portion of the field of regard.

17. The method of claim 14, wherein:
the scan pattern has a particular horizontal resolution, and
wherein the method further comprises increasing the horizontal resolution for the ground portion of the field of regard.

18. The method of claim 17, wherein:
the scan pattern comprises a particular scanning rate, and
increasing the horizontal resolution for the ground portion of the field of regard includes decreasing the scanning rate when scanning the ground portion of the field of regard.

19. The method of claim 17, wherein:
the light source emits the pulses of light at a particular pulse repetition frequency; and
increasing the horizontal resolution for the ground portion of the field of regard includes increasing the pulse repetition frequency when scanning the ground portion of the field of regard.

20. The method of claim 17, wherein increasing the horizontal resolution for the ground portion of the field of regard includes selecting a horizontal resolution in view of the expected distance from the lidar system to the ground portion.

21. The method of claim 14, wherein adjusting the pulse energy includes decreasing the pulse energy of the emitted pulses of light when the emitted pulses of light scan the ground portion of the field of regard.

22. The method of claim 21, further comprising:
increasing the pulse energy when the emitted pulses of light scan the other portion of the field of regard, so that an average power of the emitted pulses of light for a subsequent scan of the field of regard is less than or equal to a particular threshold average power.

23. The method of claim 14, wherein adjusting the pulse energy for the ground portion includes increasing the pulse energy when the estimate of the angle of incidence of the one or more emitted pulses of light is below a certain threshold value corresponding to a low-grazing angle.

24. The method of claim 14, further comprising:
determining, based on a previous scan of the field of regard, a low-scatter portion of the field of regard that produces a relatively low amount of scattered light and a high-scatter portion of the field of regard that produces a relatively high amount of scattered light, and
wherein adjusting the pulse energy for the ground portion includes at least one of:
increasing the pulse energy when the emitted pulses of light scan the low-scatter portion of the field of regard, and
decreasing the pulse energy when the emitted pulses of light scan the high-scatter portion of the field of regard.

25. An autonomous vehicle comprising:
vehicle maneuvering components to effectuate at least steering, acceleration, and braking of the autonomous vehicle; and
a lidar system including:
a light source configured to emit pulses of light,
a scanner configured to scan at least a portion of the emitted pulses of light along a scan pattern contained within a field of regard of the lidar system, wherein the field of regard includes a ground portion that overlaps a region of ground located ahead of the lidar system, and a receiver configured to detect at least a portion of the scanned pulses of light scattered by one or more remote targets; and a vehicle controller communicatively coupled to the vehicle maneuvering components and the lidar system, the vehicle controller configured to control the vehicle maneuvering components using signals generated by the lidar system;

wherein the lidar system is configured to:
identify the ground portion of the field of regard, determine one or more of: (i) an estimate of an absorption or reflectivity of a surface of the ground located ahead of the lidar system, (ii) an estimate of an angle at which one or more of the emitted pulses of light will be incident on the surface of the ground located ahead of the lidar system, and (iii) an expected distance from the lidar system to the ground portion along a path of an instantaneous field of view of the light source, and when the emitted pulses scan the ground portion of the field of regard during a subsequent scan of the field of regard, adjust a pulse energy for the ground portion of the field of regard so that the pulse energy for the ground portion is modified relative to another portion of the field of regard and wherein the pulse energy for the ground portion is adjusted further in view of one or more of: (i) the estimate of the absorption or reflectivity of the surface of the ground located ahead of the lidar system, (ii) the estimate of the angle of incidence of the one or more emitted pulses of light, and (iii) the expected distance from the lidar system to the ground portion.

26. The autonomous vehicle of claim 25, wherein the one or more remote targets comprise the ground or one or more vehicles.

27. The autonomous vehicle of claim 25, wherein:
the lidar system is included in the autonomous vehicle; and
the ground portion comprises at least a portion of a road on which the autonomous vehicle is operating.

28. The autonomous vehicle of claim 25, wherein the lidar system is configured to adjust the pulse energy in accordance with commands received from the vehicle controller.

29. The autonomous vehicle of claim 25, wherein:
the scan pattern comprises scan lines having a particular density;
the scan pattern has a particular horizontal resolution; and
the lidar system is further configured to increase at least one of (i) the density of scan lines or (ii) the horizontal resolution when scanning the ground portion of the field of regard to perform a high-resolution scan of the ground portion of the field of regard.

* * * * *